US006900949B2

(12) United States Patent
Takeuchi et al.

(10) Patent No.: US 6,900,949 B2
(45) Date of Patent: May 31, 2005

(54) OPTICAL SYSTEM OF OPTICAL PICK-UP

(75) Inventors: Shuichi Takeuchi, Saitama-ken (JP); Koichi Maruyama, Tokyo (JP); Daisuke Koreeda, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/761,318

(22) Filed: Jan. 22, 2004

(65) Prior Publication Data

US 2004/0150892 A1 Aug. 5, 2004

(30) Foreign Application Priority Data

Jan. 22, 2003 (JP) ........................... 2003-013244
Mar. 20, 2003 (JP) ........................... 2003-077279

(51) Int. Cl.[7] ................ G02B 3/02; G02B 13/18; G11B 7/00; G11B 7/20; G11B 3/74
(52) U.S. Cl. ................... 359/719; 369/44.37; 369/94
(58) Field of Search ........................... 359/719, 721, 359/708, 742, 724; 369/44.37, 44.23, 94

(56) References Cited

U.S. PATENT DOCUMENTS

| 5,446,565 | A | 8/1995 | Komma et al. |
| 5,754,513 | A | 5/1998 | Yagi et al. |
| 6,118,594 | A | 9/2000 | Maruyama |
| 6,191,889 | B1 | 2/2001 | Maruyama |
| 6,473,387 | B1 | 10/2002 | Maruyama et al. |

FOREIGN PATENT DOCUMENTS

| EP | 1056075 | 11/2000 |
| JP | 9-43510 | 2/1997 |
| JP | 9-145994 | 6/1997 |
| JP | 11-337818 | 12/1999 |
| JP | 2000-81566 | 3/2000 |
| JP | 2000-338395 | 12/2000 |

OTHER PUBLICATIONS

English Language Abstract of JP 9-145994.

*Primary Examiner*—Scott J. Sugarman
*Assistant Examiner*—Alicia Harrington
(74) *Attorney, Agent, or Firm*—Greenblum & Bernstein, P.L.C.

(57) ABSTRACT

An optical system of an optical pick-up for a plurality of types of optical discs with a corresponding plurality of light sources. A first coupling lens that is used at least for the first optical disc, and an objective lens that is used for the plurality of types of optical discs. A beam for the first optical disc emitted by the plurality of light sources passes through the first coupling lens and is incident on the objective lens as a diverging beam. The diverging beam being given spherical aberration by the coupling lens. When the objective lens shift occurs, a coma component relating to the spherical aberration of the diverging beam which is shifted with respect to the objective lens due to the shift of the objective lens is canceled by a coma generated by the objective lens and the cover layer of the first optical disc.

19 Claims, 21 Drawing Sheets

SPHERICAL ABERRATION

WAVEFRONT ABERRATION

SPHERICAL ABERRATION
OF COUPLING LENS

SPHERICAL ABERRATION

SPHERICAL ABERRATION
OF COUPLING LENS

SPHERICAL ABERRATION

SHIFT AMOUNT OF OBJECTIVE LENS (mm)

WAVEFRONT ABERRATION

SPHERICAL ABERRATION
OF COUPLING LENS

SPHERICAL ABERRATION

WAVEFRONT ABERRATION

SPHERICAL ABERRATION
OF COUPLING LENS

SPHERICAL ABERRATION

SPHERICAL ABERRATION
OF COUPLING LENS

SPHERICAL ABERRATION

SPHERICAL ABERRATION
OF COUPLING LENS

SPHERICAL ABERRATION

SPHERICAL ABERRATION
OF COUPLING LENS

SPHERICAL ABERRATION

OPTICAL SYSTEM OF OPTICAL PICK-UP

BACKGROUND OF THE INVENTION

The present invention relates to an optical system of an optical pick-up employed in an optical disc device which is used for recording/reproducing data to/from a plurality of types of optical discs having different thicknesses of cover layers.

Various types of optical discs on which digital information is recorded at various densities and which have different thicknesses of cover layers have been widely used. For example, a DVD (digital versatile disc) has a recording density higher that that of a CD (compact disc) or a CD-R (CD Recordable) and has a cover layer thinner than that of the CD or CD-R.

Since the CD (CD-R) and the DVD has the same disc size and thickness, it is desirable that a common optical pick-up is used for both of the CD (or the CD-R) and the DVD. However, in the optical system of optical pick-up, the amount of spherical aberration changes depending on the thickness of a cover layer of the optical disc being used. That is, the amount of spherical aberration changes depending on the type of the optical disc being used. Accordingly, to attain an optical system of an optical pick-up capable of supporting both of the CD (CD-R) and the DVD, it is required that the spherical aberration is corrected for both of the CD and the DVD.

A Japanese Provisional Publication No. 2000-81566 discloses an optical pick-up which is configured to correct spherical aberration caused by a difference in thickness between different types of optical discs. The optical pick-up in this publication includes an objective lens having a diffracting structure on its surface so that the change of the amount of the spherical aberration caused by the difference of the thickness of the cover layer can be corrected by wavelength dependence of action of the diffracting structure.

In general, since such an objective lens having the diffracting structure is difficult to fabricate, resin is used to form the objective lens. However, the resin has disadvantages in that its optical characteristic changes depending on temperature. That is, the objective lens formed of the resin has a problem that the optical characteristic deteriorates depending on the temperature variations.

A Japanese Provisional Publication No. HEI 11-337818 discloses another type of an objective lens of an optical pick-up. The objective lens disclosed in this publication is configured to correct a change of an optical characteristic due to temperature variations by a diffracting structure formed thereon as well as the change of the spherical aberration caused by the difference of the thickness of the cover layer of the optical disc. Since the objective lens in this publication has the above mentioned advantages, it has been used widespread at the present time.

However, the objective lens in the publication HEI 11-337818 has a problem to be solved that a working distance (i.e., a distance between the objective lens and a surface of the disc) becomes shorter when the CD or CD-R having the relatively thick cover layer is used in comparison with a case where the DVD having the relatively thin cover layer is used. It is understood that the optical disc device using this objective lens can not be downsized because a working distance for the DVD becomes longer when a required working distance for the CD (CD-R) is maintained. Such a problem concerning the working distance is very important particularly in an optical disc device targeted for a portable device such as notebook computer because the portable device has a strict requirement for downsizing.

A Japanese Provisional Publication No. HEI 9-43510 discloses an optical system of an optical pick-up which is configured to solve the above mentioned problem concerning the working distance. The optical system disclosed in this publication is configured such that when the DVD is used, a collimated beam enters an objective lens to correct spherical aberration of the entire optical system, and that when the CD (CD-R) is used, a diverging beam enters the objective lens.

When the diverging beam is incident on the objective lens (when the CD is used), the spherical aberration caused by the objective lens changes to an undercorrected direction, while the spherical aberration caused by the cover layer of the CD changes to an overcorrected direction. In this case, the spherical aberration caused by the objective lens and the spherical aberration caused by the cover layer of the CD cancel each other. Thus, the spherical aberration is corrected both in the cases of the CD and the DVD.

When the CD is used, the working distance becomes longer than that in the case of the DVD because the diverging beam enters the objective lens when the CD is used. With this structure, the above mentioned problem that the working distance of the CD becomes too short can be solved.

Although, in the optical pick-up disclosed in the publication HEI 9-43510, the spherical aberration is corrected both in the cases of the CD and DVD, a coma caused by an off-axis ray becomes greater in comparison with a case in which a collimated beam enters the objective lens. The coma becomes greater particularly when the objective lens has an installation position error or when the objective lens shifts from a home position for tracking operation in a plane substantially perpendicular to an optical axis of the objective lens. In the followings, such a "lateral" shifting of the objective lens for the tracking operation and/or due to positioning errors is frequently expressed by the words "objective lens shift".

If the optical pick-up in the publication HEI 9-43510 is used in a playback-only device, the optical pick-up delivers excellent performance because an numerical aperture (NA) on an image side (which is also expressed by the words "image side NA") required for the reproducing operation is relatively low and thereby the coma caused by the objective lens can be kept within an allowable level. However, the optical pick-up may not be adequate for the recording operation because the recording operation requires a high NA on the image side and has a strict requirement for correction of aberrations.

A Japanese Provisional Publication No. 2000-338395 discloses an optical system for the recordlng/reproducing operation. The optical system uses a finite object distance when the CD is used. The optical system has a coupling lens configured to cause no aberration within its central area and to cause spherical aberration within its peripheral area. When an objective lens is not laterally shifted from a home position (i.e., when the objective lens shift does not occur), a beam passed through the coupling lens within its central area (i.e., a beam having no aberration) is incident on the objective lens. When the objective lens shift occurs, a beam passed through the peripheral area of the coupling lens is incident on the objective lens.

The spherical aberration given by the coupling lens when the objective lens shift occurs is used to cancel part of a coma caused by the objective lens and a cover layer of a disc.

However, according to the optical system disclosed in the publication No. 2000-338395, only one side of the coma which is distributed symmetrically about a point is canceled. Therefore, an adequate correction for the coma can not be attained. Further, a coma of a higher order remains in the optical system. Furthermore, the coupling lens disclosed in this publication is difficult to fabricate and to evaluate aberrations.

SUMMARY OF THE INVENTION

The present invention is advantageous in that it provides an optical system of an optical pick-up configured to support a plurality types of optical discs, to be capable of providing a sufficiently long working distance for an optical disc having a relatively thick cover layer, and to be capable of correcting aberrations sufficiently.

According to an aspect of the invention, there is provided an optical system of an optical pick-up for recording/reproducing data to/from a plurality of types of optical discs including a first optical disc having a relatively thick cover layer and a second optical disc having relatively thin cover layer. The optical system includes a plurality of light sources that correspond the plurality of types of optical discs, a first coupling lens that is used at least for the first optical disc, and an objective lens that is used for the plurality of types of optical discs.

In the above structure, the first coupling lens is located on a light source side of the objective lens. A beam for the first optical disc emitted by one of the plurality of light sources passes through the first coupling lens and is incident on the objective lens as a diverging beam, the diverging beam being given spherical aberration by the coupling lens. Further, the spherical aberration of the diverging beam for the first optical disc and spherical aberration caused by the objective lens and a cover layer of the first optical disc canceling each other. Further, when the objective lens shifts in a plane substantially perpendicular to an optical axis of the objective lens, a coma component relating to the spherical aberration of the diverging beam which is shifted with respect to the objective lens due to the shift of the objective lens is canceled by a coma generated by the objective lens and the cover layer of the first optical disc.

With the above configuration of the optical system, the diverging beam has a laterally shifted spherical aberration with respect to the objective lens as a consequence of the objective lens shift. Since, the coma component included in the laterally shifted spherical aberration has a direction opposite to the coma generated by the objective lens and the cover layer of the first optical disc, a total amount of coma in the entire optical system when the objective lens shift occurs can be suppressed sufficiently.

Optionally, the spherical aberration of the diverging beam for the first optical disc may be such that an amount of wavefront delay becomes greater as a distance from a center axis of the coupling lens increases.

Still optionally, a degree of divergence of the diverging beam for the first optical disc incident on the objective lens may be largest of all of degrees of divergence of beams emitted by the plurality of light sources when each of the beams is incident on the objective lens.

In a particular case, when the first optical disc is used, a magnification $M_{OBL1}$ of the objective lens may satisfy a condition:

$$-0.15 < M_{OBL1} < -0.03 \qquad (1).$$

If $M_{OBL1}$ gets lower than the lower limits of the condition (1), an effective diameter of the objective lens required to secure a desired image side NA for the recording/reproducing operation for the first optical disc becomes too large, and therefore the objective lens is upsized excessively. If $M_{OBL1}$ gets larger than the upper limits of the condition (1), the advantage that the difference between the working distances of the DVD and the CD becomes shorter is weakened.

Optionally, the optical system may include a second coupling lens that is used for the second optical disc, the second coupling lens being located on the light source side of the objective lens.

Alternatively, the first coupling lens may be used for both of the first optical disc and the second optical disc.

Optionally, the beam for the first optical disc and a beam for the second optical disc emitted by the plurality of light sources may have different wavelengths, the first coupling lens may have a diffracting structure on at least one of its lens surfaces, and when the beam for the second optical disc passes through the first coupling lens, the beam for the second optical disc having no aberration may emerge from the first coupling lens.

In a particular case, a beam for the second optical disc emerged from the second coupling lens may have a wavefront having a form of a substantially flat plane.

Optionally, when the second optical disc is used, a magnification $M_{OBL2}$ of the objective lens may satisfy a condition:

$$-0.01 < M_{OBL2} < 0.01 \qquad (2).$$

When the condition (2) is satisfied, a coma and an astigmatism can be reduced sufficiently.

In a particular case, a beam for the second optical disc emerged from the first coupling lens may have a wavefront having a form of a substantially flat plane.

In a particular case, the objective lens may be configured not to cause a coma when a beam for a certain type optical disc of the plurality of types of optical discs other than the first optical disc incident thereon inclines with respect to the optical axis of the objective lens.

In a particular case, the certain type optical disc may require an image side numerical aperture largest of all of the plurality of types of optical discs.

Optionally, the objective lens may satisfy a condition:

$$|M_{OBL1}| > |M_{REF}|$$

where $M_{OBL1}$ represents a magnification of the objective lens when the diverging beam for the first optical disc having the spherical aberration given by the first coupling lens is incident on the objective lens, and $M_{REF}$ represents a magnification of the objective lens at which spherical aberration caused by the objective lens and the cover layer of the first optical disc takes a value closest to zero when a hypothetical diverging beam which is equivalent to the diverging beam for the first optical disc but has no aberration is incident on the objective lens, the hypothetical diverging beam having a wavelength for the first optical disc. Further, the spherical aberration of the diverging beam for the first optical disc may be such that an amount of wavefront delay becomes greater as a distance from a center axis of the coupling lens increases.

Still optionally, the first coupling lens may be configured to be a meniscus lens having a convex side thereof located on an optical disc side and to satisfy a condition:

$$1.0 < (Ra+Rb)/(Ra-Rb) < 15.0 \qquad (3)$$

where Ra represents a radius of curvature of a light source side surface of the first coupling lens, and Rb represents a radius of curvature of an optical disc side surface of the first coupling lens. Further, one of the light source side surface and the optical disc side surface of the first coupling lens may have an aspherical surface having a positive aspheric amount at a maximum effective diameter thereof.

By using the coupling lens satisfying the condition (3), a coma caused by a shift of the coupling lens can be canceled by a coma which the objective lens generates when off-axis light is incident on the objective lens due to the shift of the coupling lens. If the (Ra+Rb)/(Ra−Rb) gets larger than the upper limit of the condition (3), although the coma caused by the coupling lens shift can be reduced, the astigmatism becomes larger. If the (Ra+Rb)/(Ra−Rb) gets lower than the lower limit of the condition (3), the advantage that the coma caused by the coupling lens shift decreases is weakened.

Still optionally, the optical system may satisfy a condition:

$$0.15 < (-Rb/f) \times (M_{OBL1}/M_{REF})^4 < 0.55 \qquad (4)$$

where $M_{OBL1}$ represents a magnification of the objective lens when the diverging beam for the first optical disc having the spherical aberration given by the first coupling lens is incident on the objective lens, $M_{REF}$ represents a magnification of the objective lens at which spherical aberration caused by the objective lens and the cover layer of the first optical disc takes a value closest to zero when a hypothetical diverging beam which is equivalent to the diverging beam for the first optical disc but has no aberration is incident on the objective lens, and f represents a focal length of the first coupling lens, the hypothetical diverging beam having a wavelength for the first optical disc.

If the $(-Rb/f) \times (M_{OBL1}/M_{REF})^4$ gets larger than the upper limit of the condition (4), the advantage that the coma caused by the coupling lens shift is weakened. If the $(-Rb/f) \times (M_{OBL1}/M_{REF})^4$ gets lower than the lower limit of the condition (4), although the coma caused by the coupling lens shift can be reduced, the astigmatism becomes larger.

Still optionally, the objective lens may satisfy a condition:

$$1.02 < M_{OBL1}/M_{REF} < 1.05 \qquad (5).$$

If the $M_{OBL1}/M_{REF}$ gets larger than the upper limit of the condition (5), the coma caused by the coupling lens shift can not be reduced sufficiently, and the coma caused when the objective lens shift occurs becomes larger. If the $M_{OBL1}/M_{REF}$ gets lower than the lower limit of the condition (5), the coma generated by the objective lens when the coupling lens shifts becomes too large.

In a particular case, the first coupling lens may satisfy a condition:

$$-1.0 < (Ra+Rb)/(Ra-Rb) < 7.0 \qquad (6)$$

where Ra represents a radius of curvature of a light source side surface of the first coupling lens, and Rb represents a radius of curvature of an optical disc side surface of the first coupling lens. Further, each of the light source side surface and the optical disc side surface of the first coupling lens may have an aspherical surface having a positive aspheric amount at a maximum effective diameter thereof.

When the both of the surfaces of the coupling lens are aspherical surfaces, the coma generated by the coupling lens when the coupling lens shift occurs and the coma generated by the objective lens when off-axis light is incident on the objective lens due to the coupling lens shift cancel each other.

If the (Ra+Rb)/(Ra−Rb) gets larger than the upper limit of the condition (6), although the coma caused by the coupling lens shift can be reduced, the astigmatism becomes larger. Further, returning light (reflected light from a lens surface) may cause an undesired effect on the light sources. If the (Ra+Rb)/(Ra−Rb) gets lower than the lower limit of the condition (6), the advantage that the coma caused by the coupling lens shift decreases is weakened or the coma due to a shift of a surface of the coupling lens becomes larger.

Still optionally, the optical system may satisfy a condition:

$$0.30 < (-Rb/f) \times (M_{OBL1}/M_{REF})^4 < 1.00 \qquad (7)$$

where $M_{OBL1}$ represents a magnification of the objective lens when the diverging beam for the first optical disc having the spherical aberration given by the first coupling lens is incident on the objective lens, $M_{REF}$ represents a magnification of the objective lens at which spherical aberration caused by the objective lens and the cover layer of the first optical disc takes a value closest to zero when a hypothetical diverging beam which is equivalent to the diverging beam for the first optical disc but has no aberration is incident on the objective lens, and f represents a focal length of the first coupling lens, the hypothetical diverging beam having a wavelength for the first optical disc.

If the $(-Rb/f) \times (M_{OBL1}/M_{REF})^4$ gets larger than the upper limit of the condition (7), the advantage that the coma caused by the coupling lens shift is weakened or the coma due to a shift of a surface of the coupling lens becomes larger. If the $(-Rb/f) \times (M_{OBL1}/M_{REF})^4$ gets lower than the lower limit of the condition (7), although the coma caused by the coupling lens shift can be reduced, the astigmatism becomes larger. Further, returning light (reflected light from a lens surface) may cause an undesired effect on the light sources.

BRIEF DESCRIPTION OF THE ACCOMPANYING DRAWINGS

FIG. 1 schematically shows an optical system of an optical pick-up according to a first embodiment of the invention;

Figure 8:
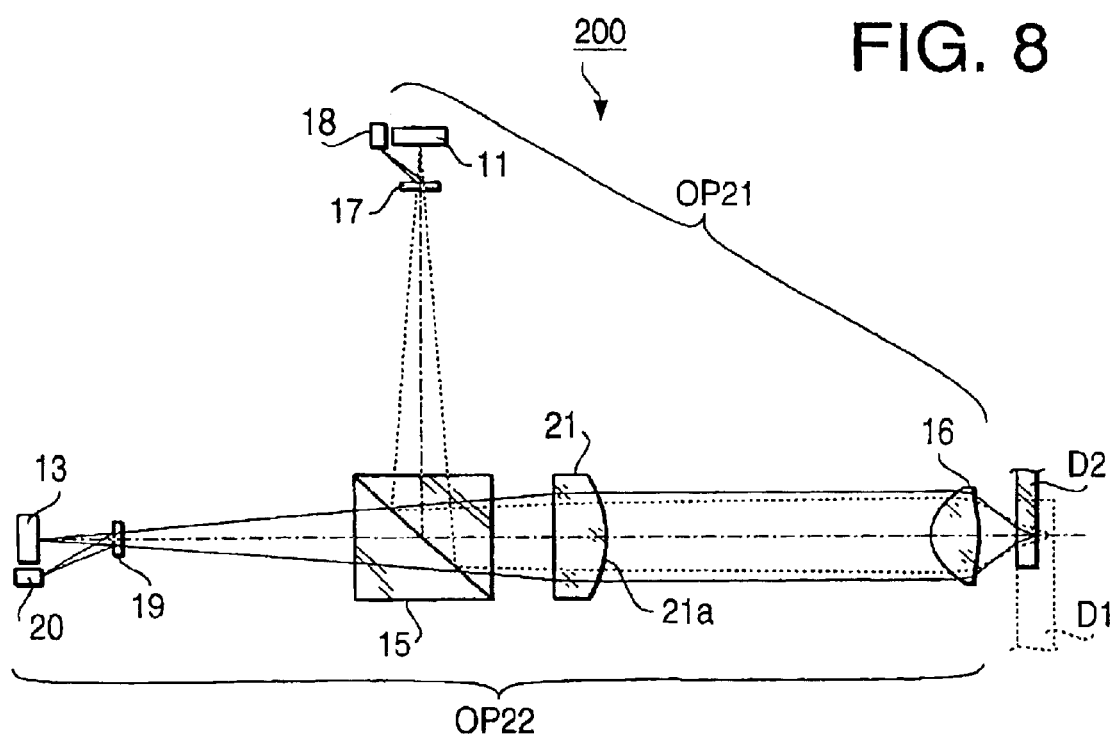
Figure 9:
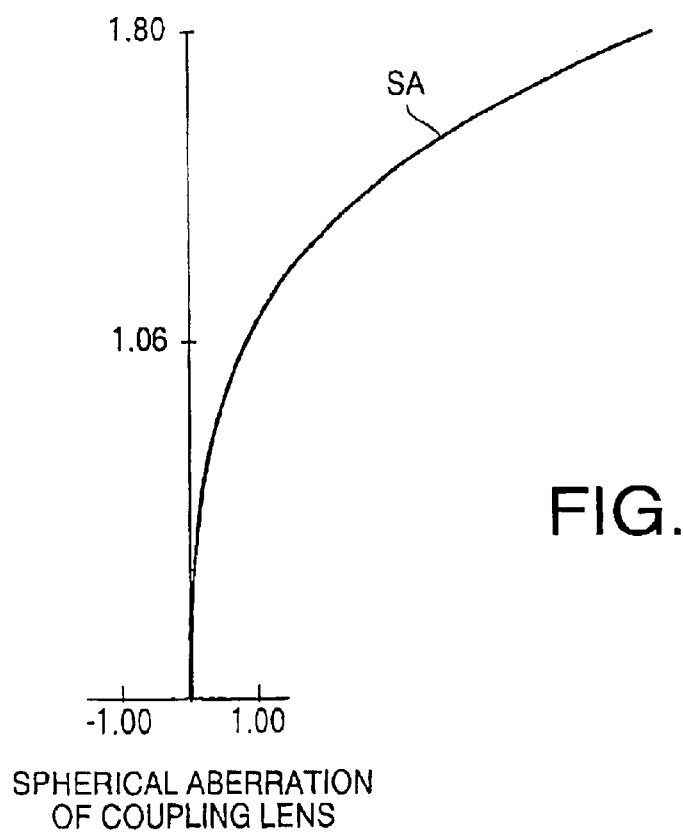
Figure 10:
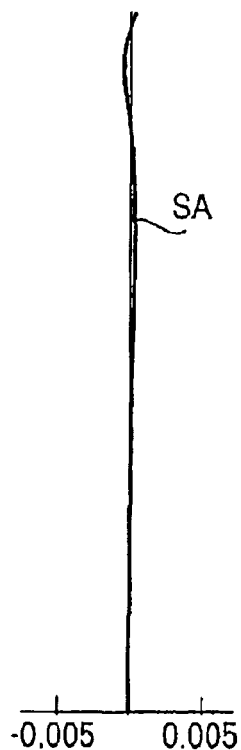
Figure 11:
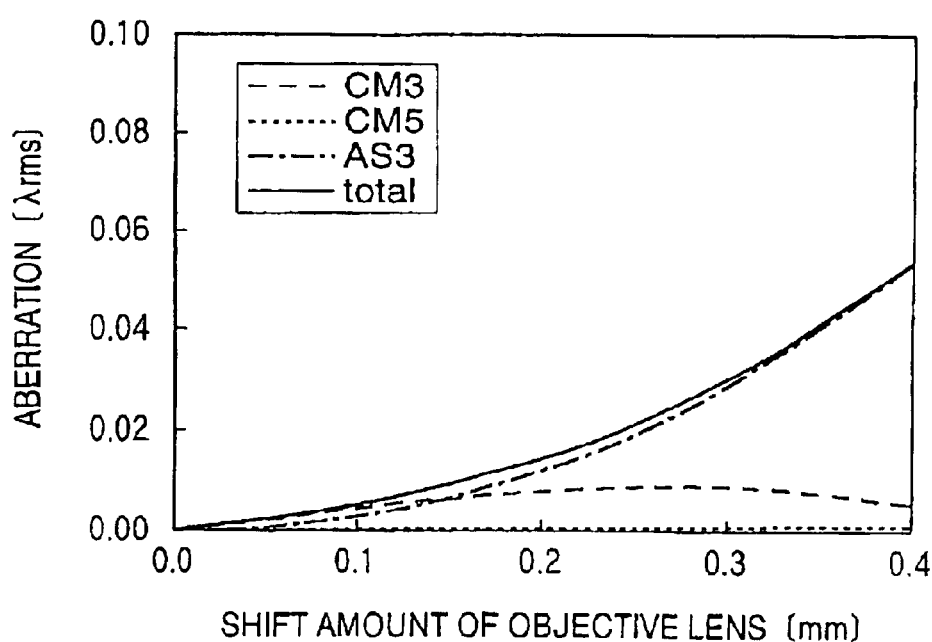
Figure 12:
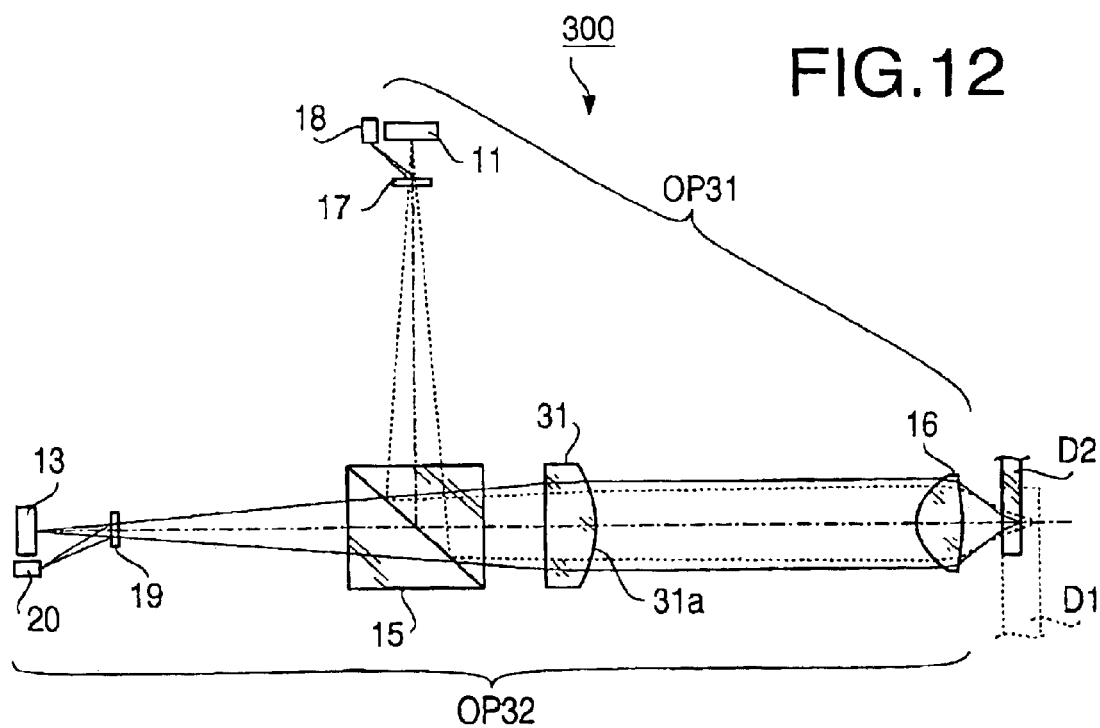
Figure 13:
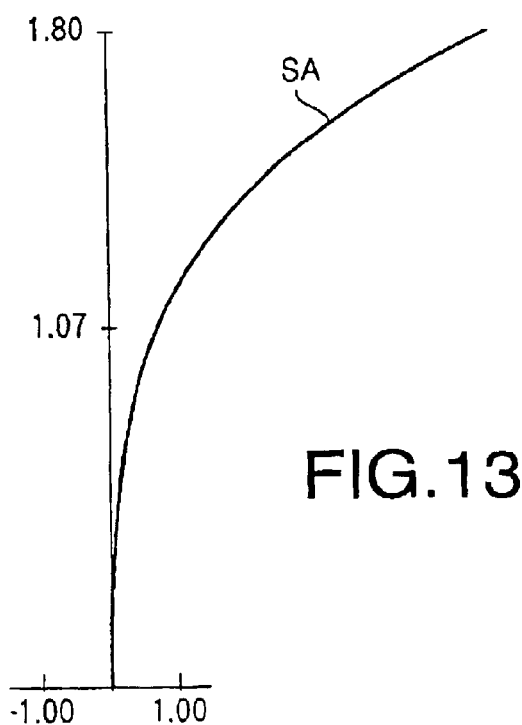
Figure 14:
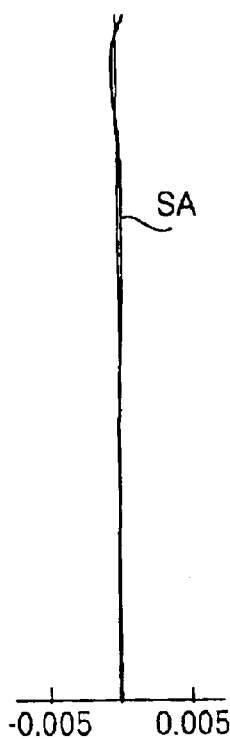
Figure 15:
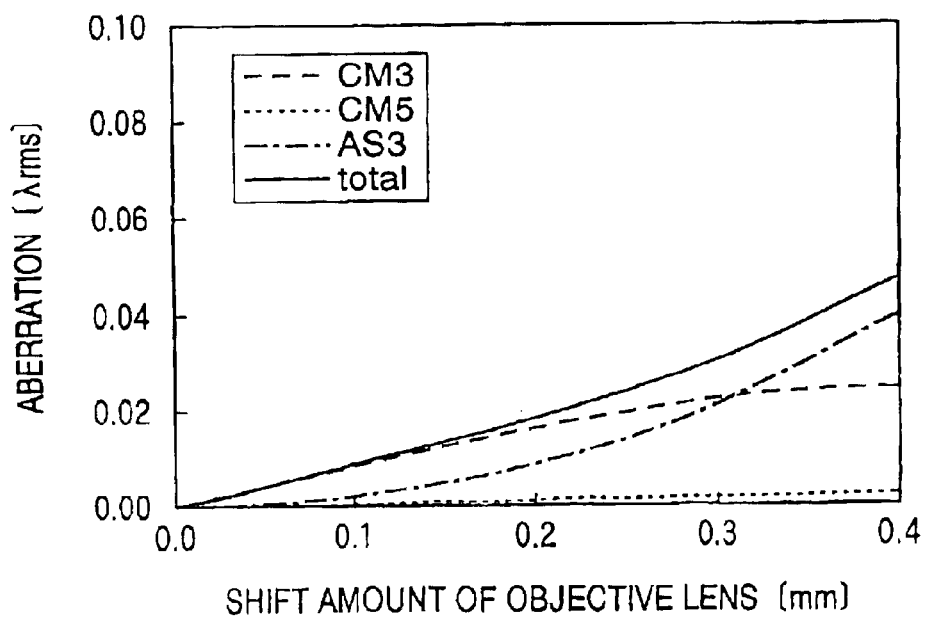
Figure 16:
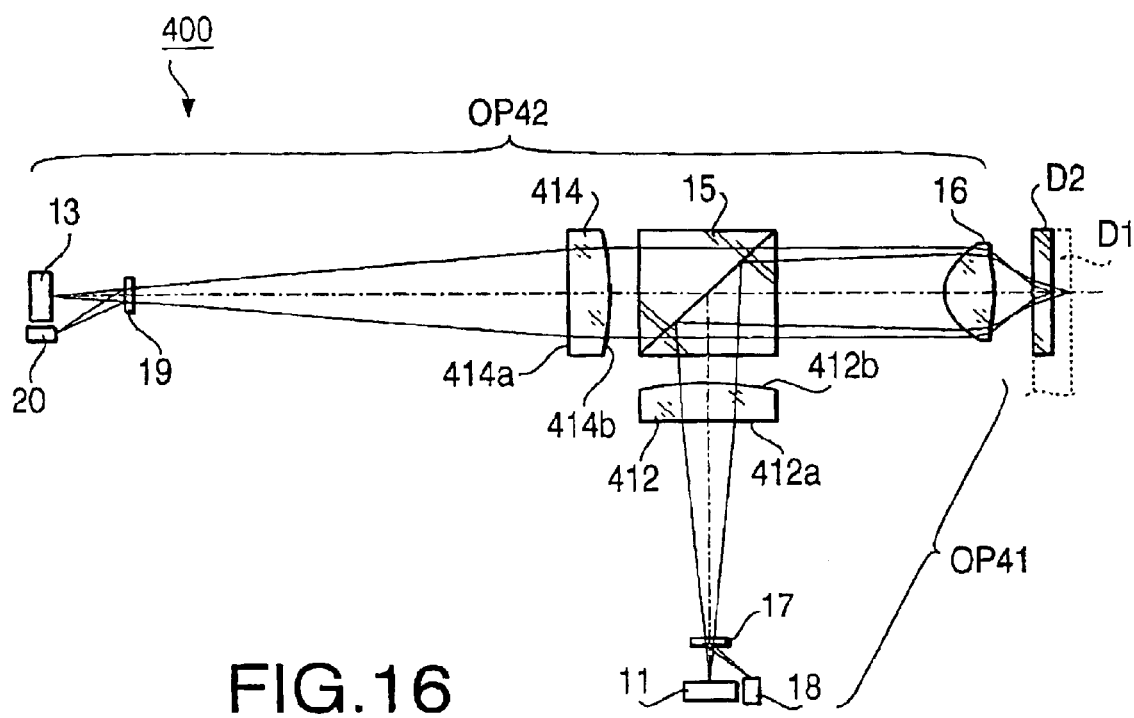
Figure 17:
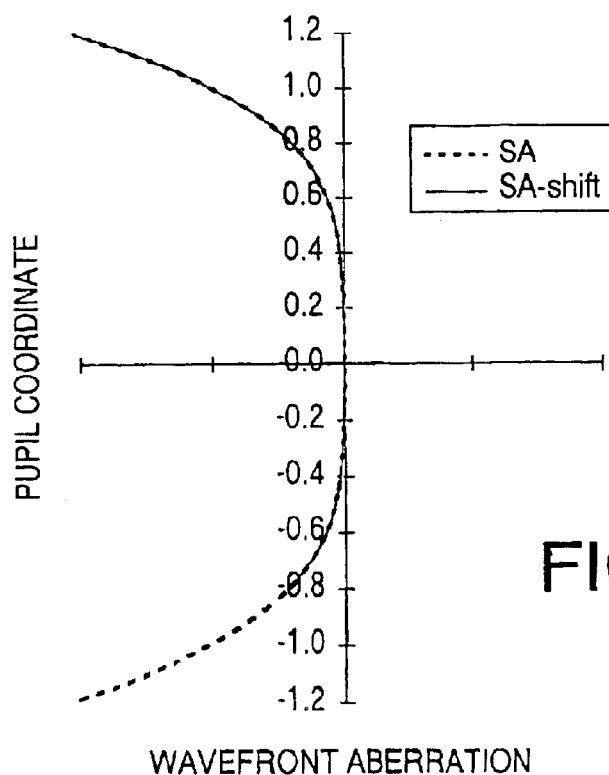
Figure 18:
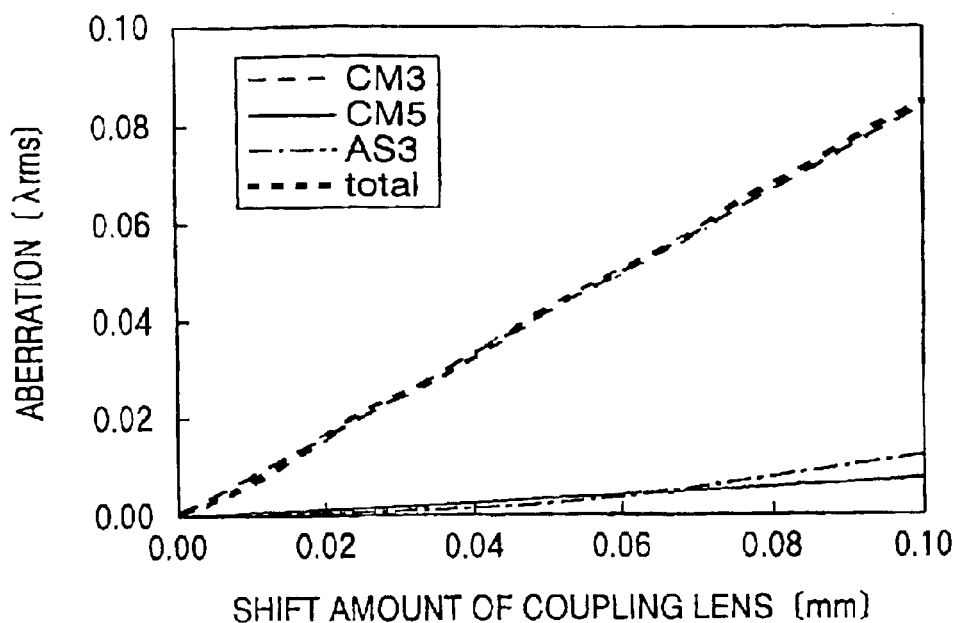
Figure 19:
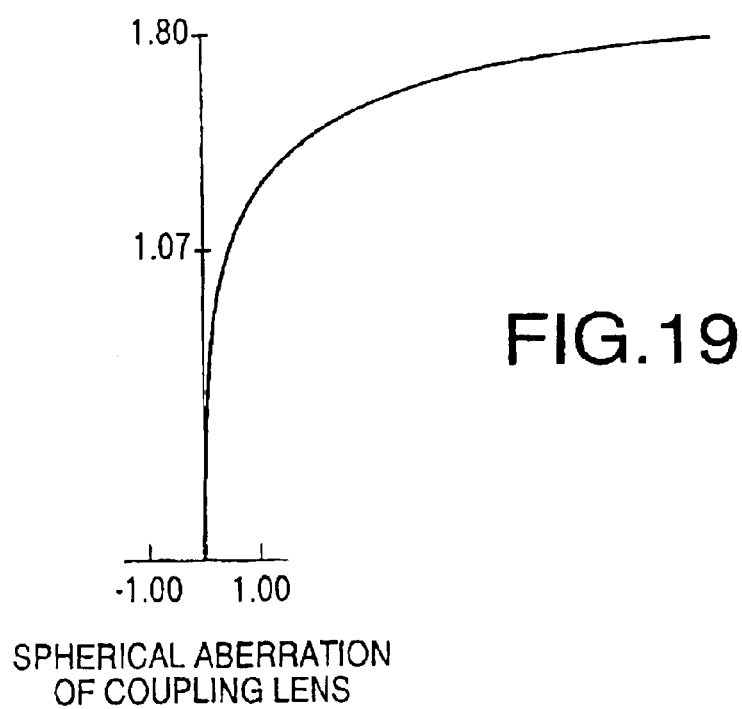
Figure 20:
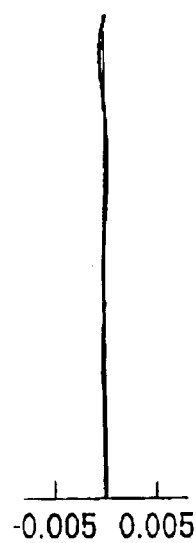
Figure 21:
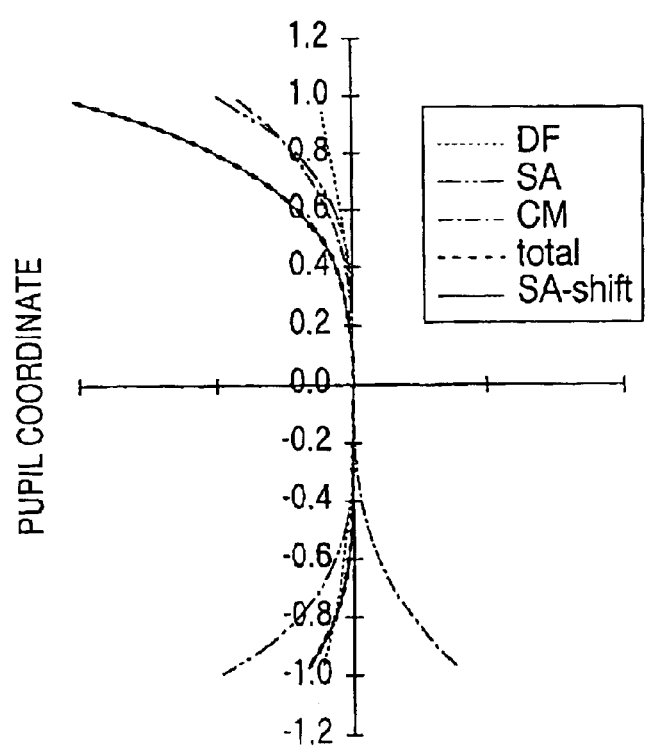
Figure 22:
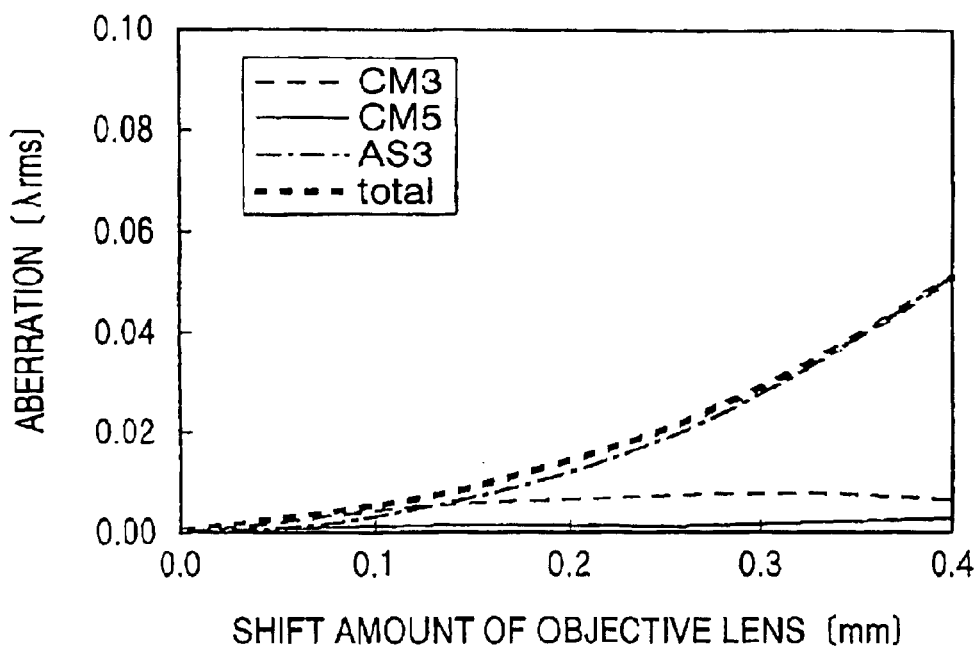
Figure 23:
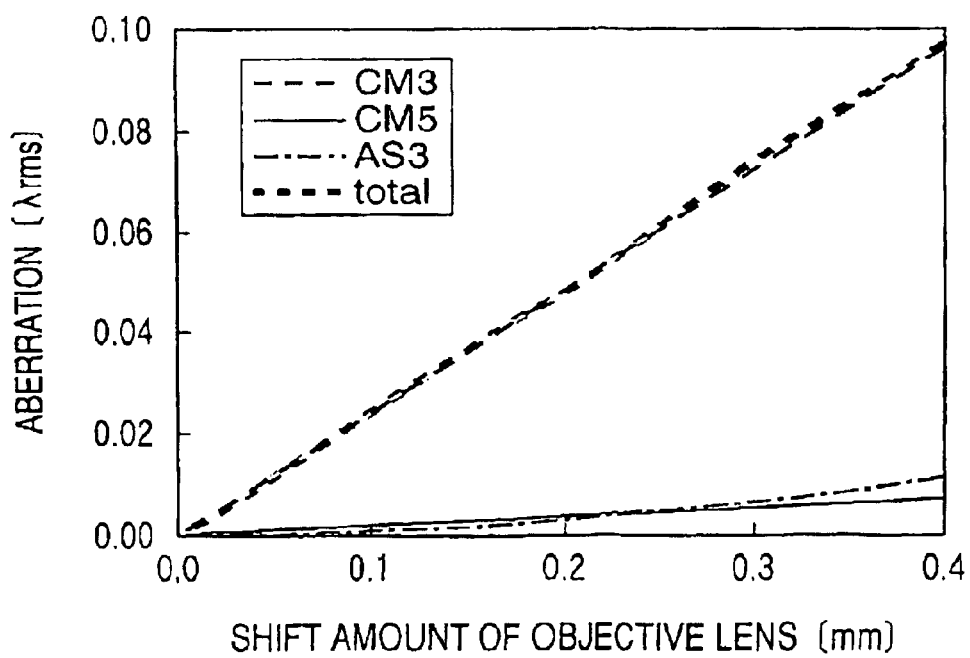
Figure 24:
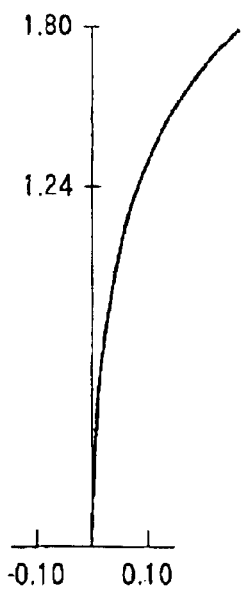
Figure 25:
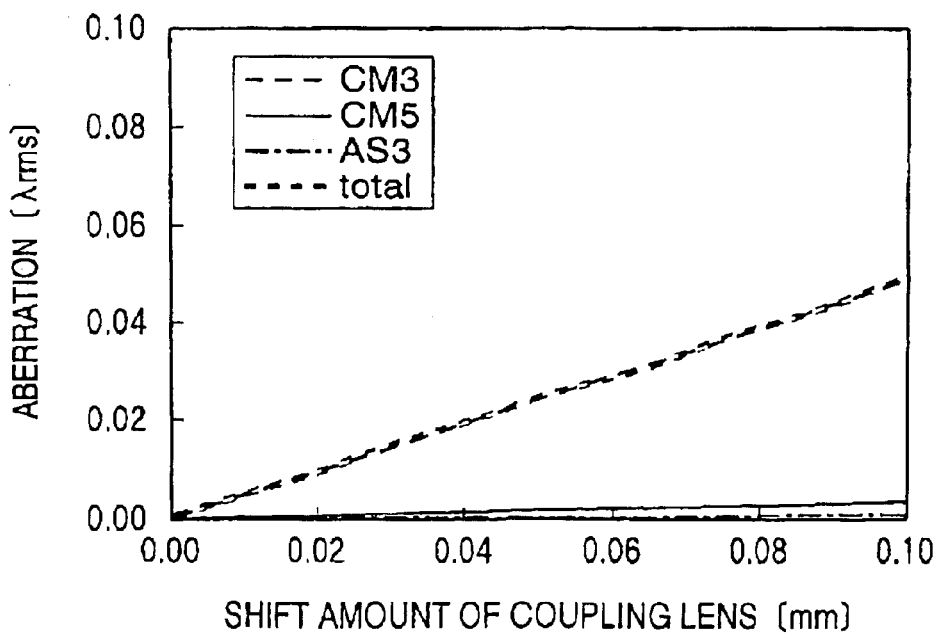
Figure 26:
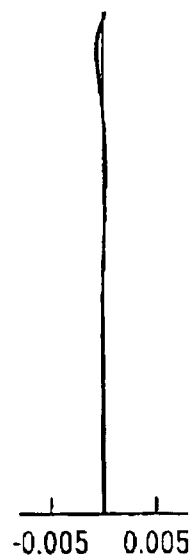
Figure 27:
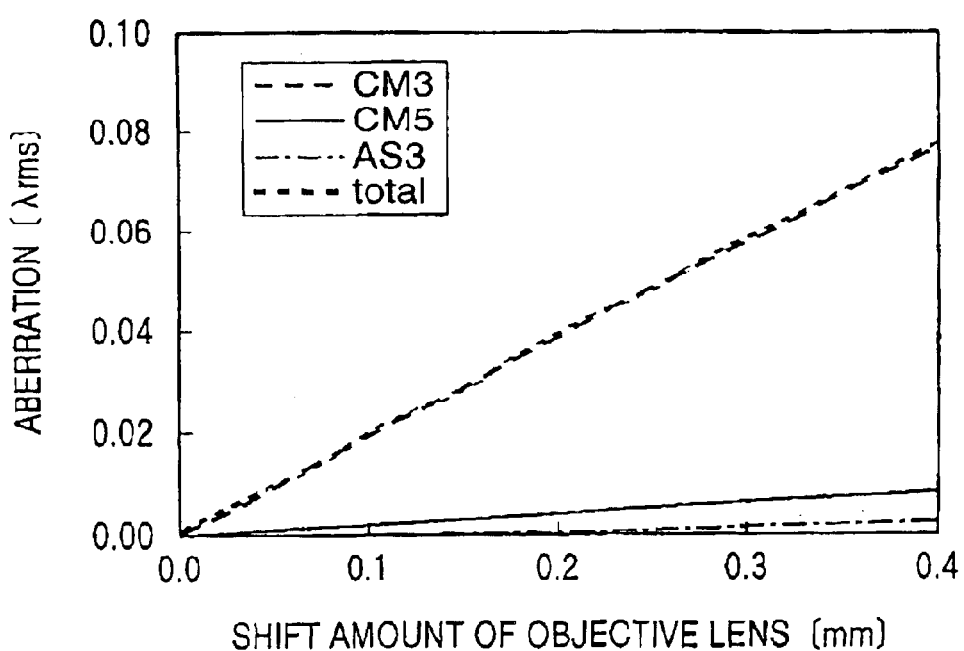
Figure 28:
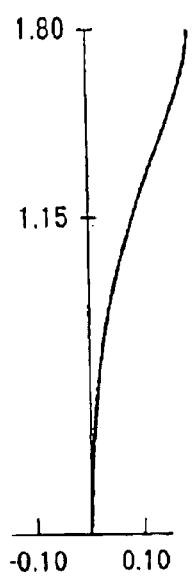
Figure 29:
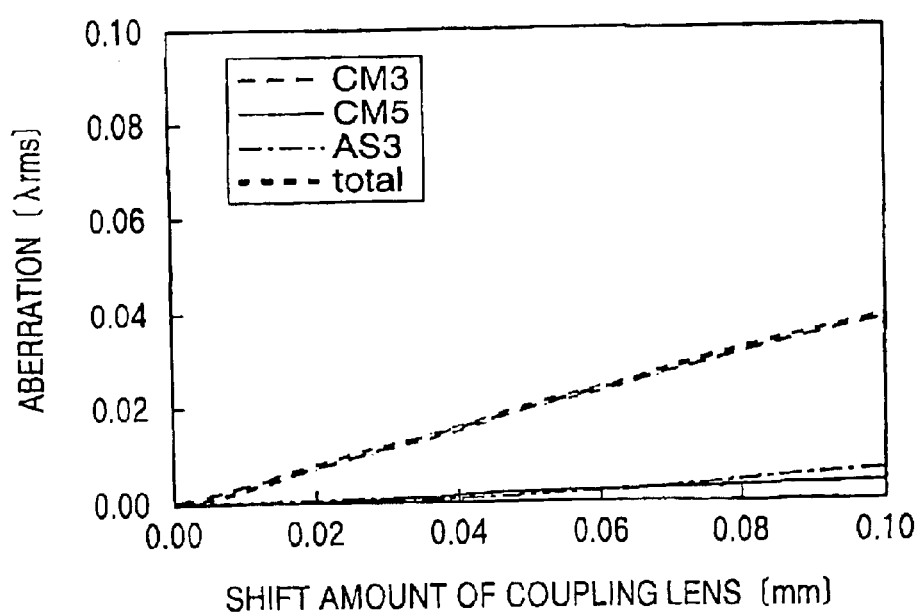
Figure 30:
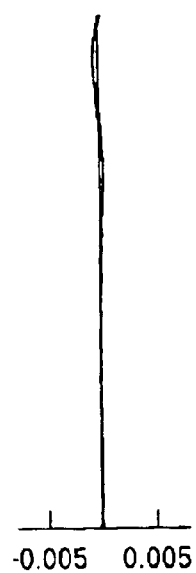
Figure 31:
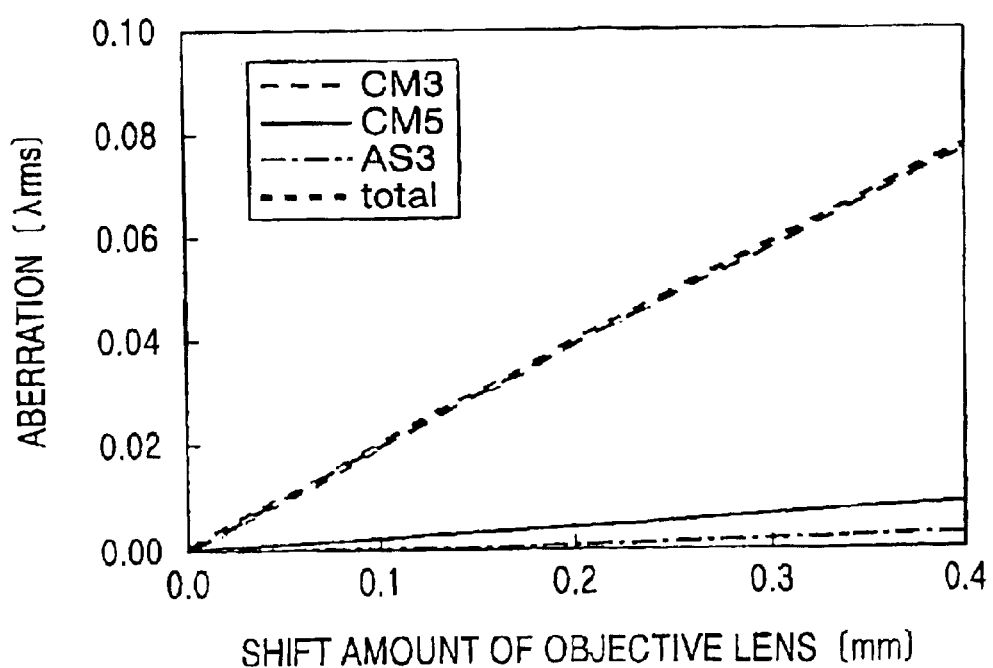
Figure 32:
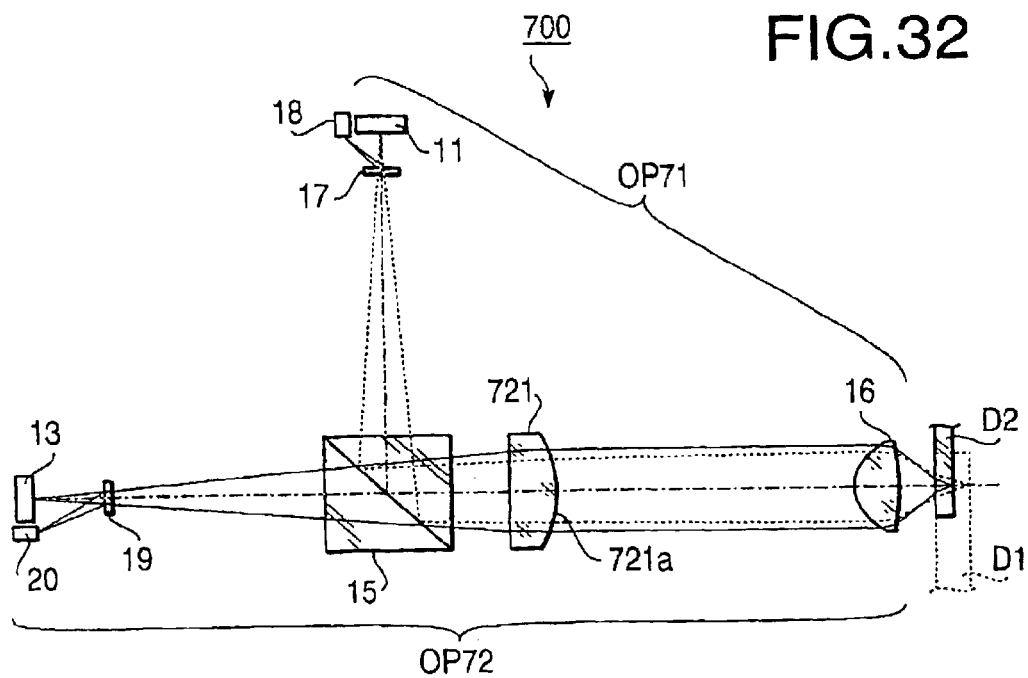
Figure 33:
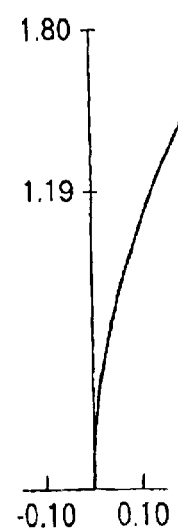
Figure 34:
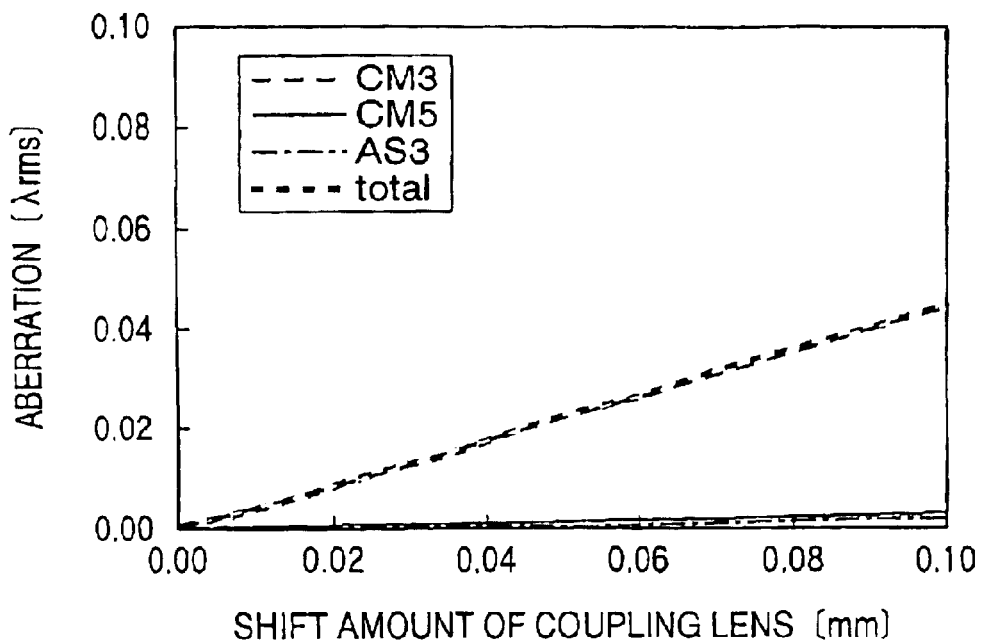
Figure 35:
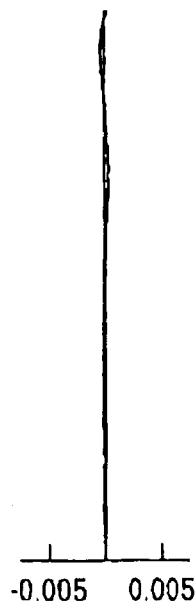
Figure 36:
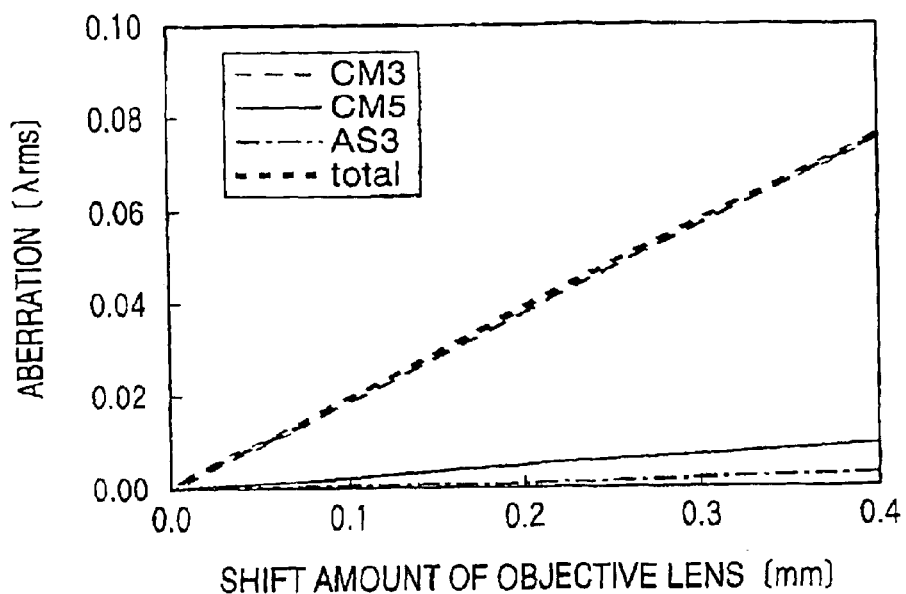
Figure 37:
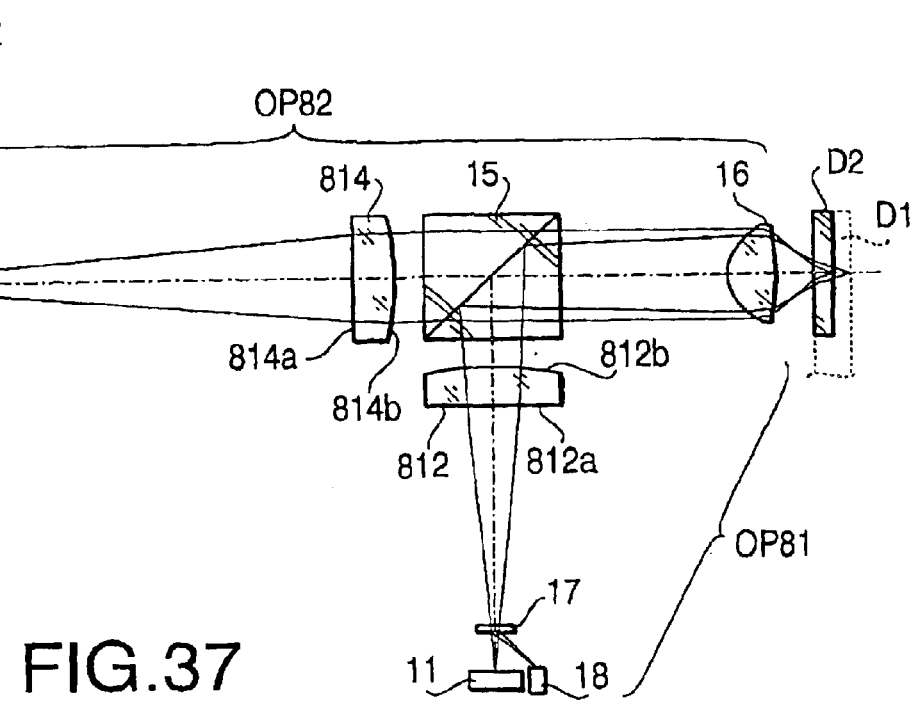
Figure 38:
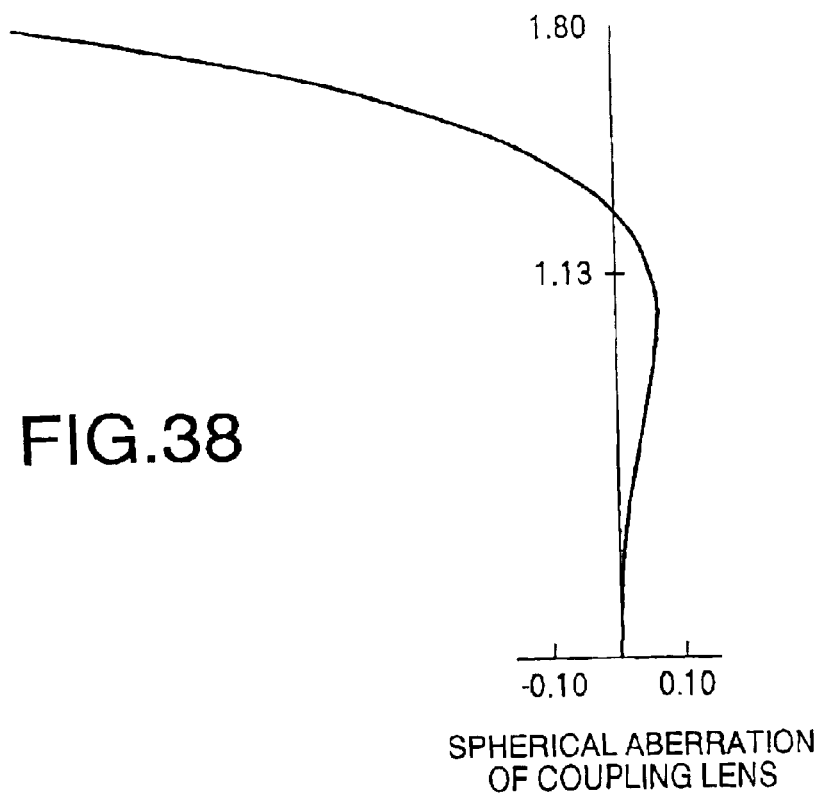
Figure 39:
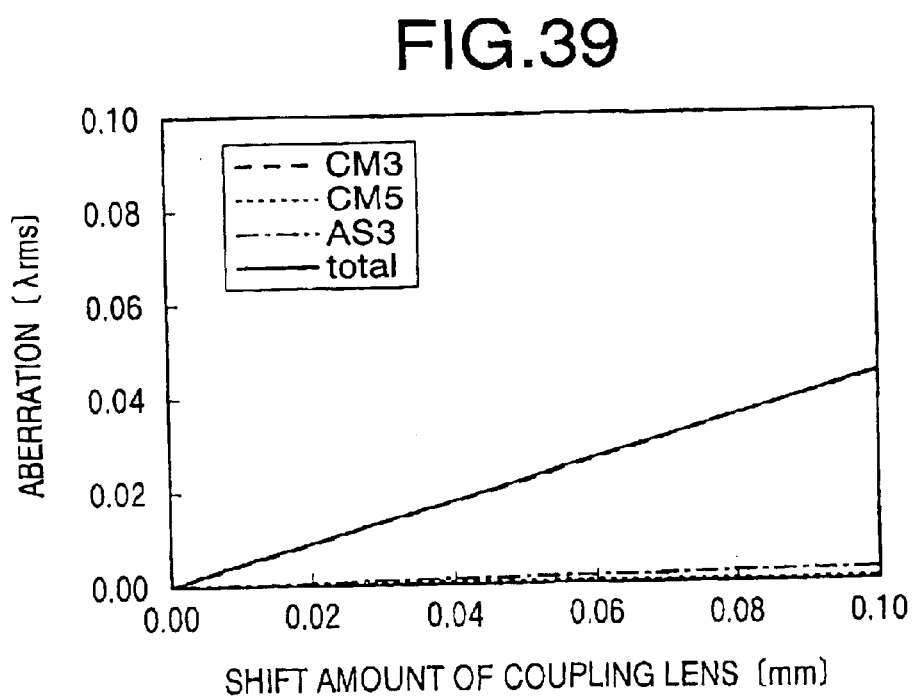
Figure 40:
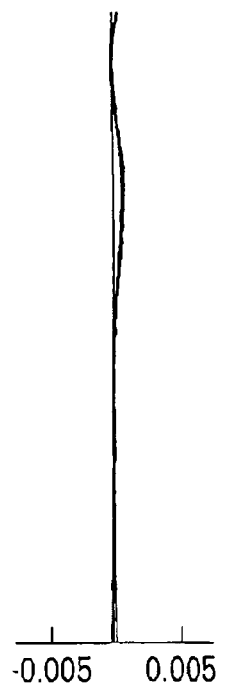
Figure 41:
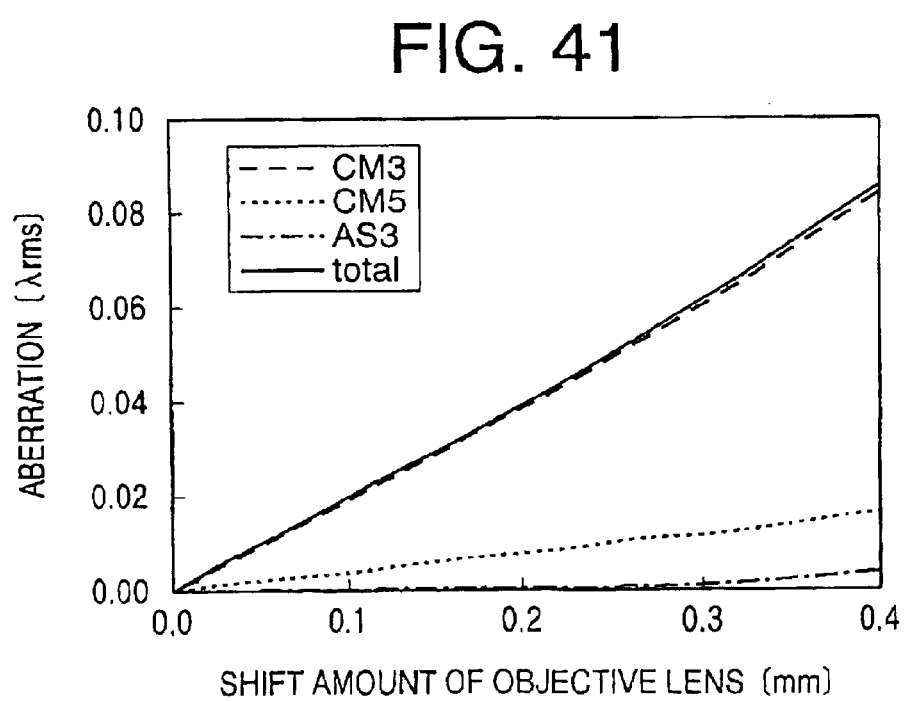

FIG. 8 schematically shows an optical system of an optical pick-up according to a second embodiment of the invention;

FIG. 9 is a graph illustrating the spherical aberration caused by a coupling lens shown in FIG. 8;

FIG. 10 is a graph illustrating spherical aberration of the entire optical system for the first optical disc according to the second embodiment;

FIG. 11 is a graph illustrating the amounts of aberrations caused in the entire optical system for the first optical disc with respect to the shift amount of the objective lens;

FIG. 12 schematically shows an optical system of an optical pick-up according to a third embodiment of the invention;

FIG. 13 is a graph illustrating the spherical aberration caused by a coupling lens shown in FIG. 12;

FIG. 14 is a graph illustrating spherical aberration of the entire optical system;

FIG. 15 is a graph illustrating the amounts of aberrations caused in the entire optical system with respect to the shift amount of the objective lens of the third embodiment;

FIG. 16 schematically shows an optical system of an optical pick-up according to a fourth embodiment of the invention;

FIG. 17 is a graph illustrating wavefront aberration of a beam emerged from a coupling lens for the first optical disc shown in FIG. 16;

FIG. 18 is a graph illustrating the amounts of aberrations caused in the entire optical system for the first optical disc with respect to a shift amount of the coupling lens of the fourth embodiment;

FIG. 19 is a graph illustrating the spherical aberration generated by the coupling lens for the first optical disc;

FIG. 20 is a graph illustrating the spherical aberration in the entire optical system for the first optical disc;

FIG. 21 is a graph illustrating distributions of aberrations of a diverging beam when the diverging beam having a laterally shifted wavefront aberration is incident on the objective lens due to the tracking operation;

FIG. 22 is a graph illustrating the amounts of aberrations caused in the entire optical system for the first optical disc with respect to a shift amount of the objective lens;

FIG. 23 is a graph illustrating amounts of aberrations cased in a comparative example of an optical system of an optical pick-up with respect to a shift amount of an objective lens in the comparative example;

FIG. 24 is a graph illustrating the spherical aberration caused by the coupling lens for the first optical disc according to a fifth embodiment;

FIG. 25 is a graph illustrating the amounts of aberrations caused in the entire optical system for the first optical disc with respect to a shift amount of the coupling lens;

FIG. 26 shows a graph illustrating the total spherical aberration in the optical system for the first optical disc;

FIG. 27 is a graph illustrating the amounts of aberrations caused in the entire optical system for the first optical disc with respect to a shift amount of the objective lens;

FIG. 28 is a graph illustrating the spherical aberration caused by a coupling lens for the first optical disc according to a sixth embodiment;

FIG. 29 is a graph illustrating the amounts of aberrations caused in the entire optical system for the first optical disc with respect to a shift amount of the coupling lens;

FIG. 30 shows a graph illustrating the total spherical aberration in the optical system for the first optical disc;

FIG. 31 is a graph illustrating the amounts of aberrations caused in the entire optical system for the first optical disc with respect to a shift amount of the objective lens;

FIG. 32 schematically shows an optical system of an optical pick-up according to a seventh embodiment of the invention;

FIG. 33 is a graph illustrating the spherical aberration generated by a coupling lens shown in FIG. 32;

FIG. 34 is a graph illustrating the amounts of aberrations caused in the entire optical system with respect to a shift amount of the coupling lens of the seventh embodiment;

FIG. 35 shows a graph illustrating the total spherical aberration in the optical system;

FIG. 36 is a graph illustrating the amounts of aberrations caused in the entire optical system with respect to a shift amount of the objective lens of the seventh embodiment;

FIG. 37 schematically shows an optical system of an optical pick-up according to an eighth embodiment of the invention;

FIG. 38 is a graph illustrating the spherical aberration caused by a coupling lens for the first optical disc shown in FIG. 37;

FIG. 39 is a graph illustrating the amounts of aberrations caused in the entire optical system for the first optical disc with respect to a shift amount of the coupling lens;

FIG. 40 shows a graph illustrating the total spherical aberration in the optical system for the first optical disc; and FIG. 41 is a graph illustrating the amounts of aberrations caused in the entire optical system for the first optical disc with respect to a shift amount of the objective lens of the eighth embodiment.

DETAILED DESCRIPTION OF THE EMBODIMENTS

Hereinafter, embodiments according to the invention are described with reference to the accompanying drawings.

Each optical system described below is used in an optical pick-up to record data to and/or to reproduce data from a plurality of types of optical discs including an optical disc having a relatively thick cover layer such as a CD or a CD-R and an optical disc having a relatively thin cover layer such as a DVD or a DVD-R. In this specification, such an optical pick-up is frequently expressed by the words "an optical pick-up for recording/reproducing data to/from a plurality of types of optical discs".

First Embodiment

Figure 1:
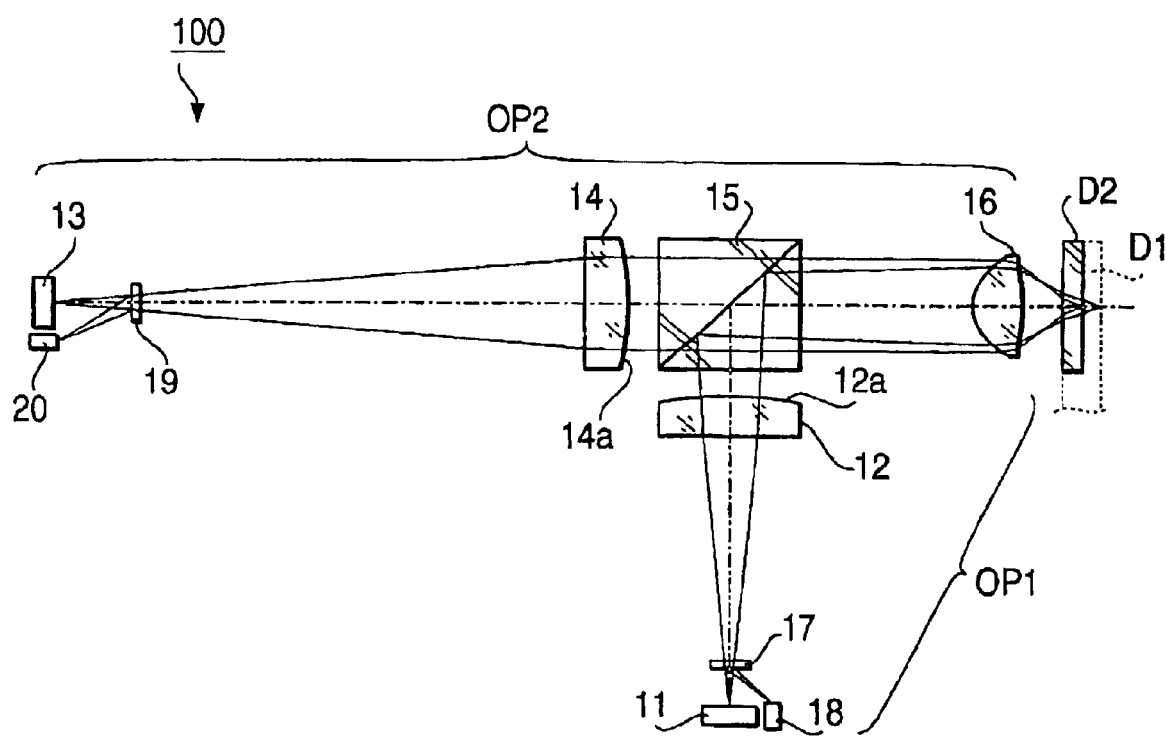

FIG. 1 schematically shows an optical system 100 of an optical pick-up according to a first embodiment of the invention. As shown in FIG. 1 the optical system 100 includes an optical system OP1 which is used to record/reproduce data to/from an optical disc D1 having relatively thick cover layer (e.g., the CD), and an optical system OP2 which is used to record/reproduce data to/from an optical disc D2 having relatively thin cover layer (e.g., the DVD).

The optical system OP1 includes a light source 11, a branching optical element 17, a coupling lens 12, a beam splitter 15, an objective lens 16 and a photoreceptor 18. The optical system OP2 includes a light source 13, a branching optical element 19, a coupling lens 14, the beam splitter 15, the objective lens 16 and a photoreceptor 20. The beam splitter 15 and the objective lens 16 are used both in the optical systems OP1 and OP2.

Table 1 shows a numerical structure of the optical system OP1 according to the first embodiment. In Table 1, $M_{ALL1}$ represents a magnification of the entire optical system OP1, and $M_{OBL1}$ represents a magnification of the objective lens 16 in the optical system OP1. In the optical system OP1, a design NA on the image side of the objective lens 16 is 0.51, and a design wavelength (i.e., a wavelength required for the recording/reproducing of the optical disc D1) is 780 nm.

TABLE 1

| | | | | |
|---|---|---|---|---|
| $M_{ALL1}$ | | −0.1929 | | |
| $M_{OBL1}$ | | −0.0814 | | |
| Design Wavelength | | 780 nm | | |
| Design NA | | 0.51 | | |

| Surface No. | r | d | n | ν |
|---|---|---|---|---|
| #0 | | 8.60 | | |
| #1 | 104.000 | 1.20 | 1.544 | 55.7 |
| #2 | −9.400 | 1.00 | | |
| #3 | | 4.00 | 1.516 | 64.2 |
| #4 | | 5.18 | | |
| #5(h < 1.30) | 1.464 | 1.40 | 1.544 | 55.7 |
| #5(h ≥ 1.30) | 1.497 | 1.40 | 1.544 | 55.7 |
| #6 | −6.000 | 0.99 | | |
| #7 | | 1.20 | 1.585 | 29.9 |
| #8 | | | | |

In Table 1, the character "Surface No." indicates surface numbers that are assigned to optical surfaces in the optical system OP1 starting from the light source 11. The #0 denotes the light source 11. The #1 and #2 denote a front surface (a light source side) and a rear surface 12a (an optical disc side) of the coupling lens 12, respectively. The #3 and #4 denote a light source side surface and an objective lens side surface of the beam splitter 15, respectively.

The #5 and #6 denote a front surface (a light source side) and a rear surface (an optical disc side) of the objective lens 16, respectively. The #7 and #8 denote a surface of the cover layer and a surface of a data recording layer of the optical disc D1, respectively.

The character "r" denotes a radius of curvature of each lens surface on its optical axis (unit: mm), "d" denotes a lens thickness-or-an interval between a optical component and a next optical component, "n" denotes a refractive index of each lens for a d-ray (588 nm), and "ν" denotes an Abbe number of each lens for the d-ray. Meanings of these characters are also applied to tables used to indicate numerical structures of optical systems according to respective embodiments described below.

As shown in Table 1, the front surface (#5) of the objective lens 16 includes an inner area formed within a height from the optical axis smaller than 1.30 mm and an outer area formed outside the inner area. The inner area and the outer area have different structures. The front surface (#1) of the coupling lens 12 is a spherical surface.

The rear surface 12a (#2) of the coupling lens 12, the front surface (#5) of the objective lens 16 and the rear surface (#6) of the objective lens 16 are rotationally-symmetrical aspherical surfaces. The rotationally-symmetrical aspherical surface is expressed by a following equation:

$$X(h) = \frac{ch^2}{1+\sqrt{1-(1+K)c^2h^2}} + A_4h^4 + A_6h^6 + A_8h^8 + A_{10}h^{10} + A_{12}h^{12}$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_4$, $A_6$, $A_8$, $A_{10}$ and $A_{12}$ are aspherical coefficients of fourth, sixth, eighth, tenth and twelfth orders, respectively.

In this specification, an aspheric amount is positive when an aspherical surface shifts on an optical disc side with respect to a base form. The base form of an aspherical surface means a spherical surface having curvature which is equal to curvature r of the aspherical surface on the optical axis of the aspherical surface.

The conical coefficient and the aspherical coefficients of the rear surface 12a (#2) of the coupling lens 12, the front surface (#5) of the objective lens 16 and the rear surface (#6) of the objective lens 16 are indicated in Table 2. As indicate in Table 2, the coefficients of the inner area and the coefficients of the outer area of the front surface of the objective lens 16 are determined independently.

TABLE 2

| | Surface No. | | | |
|---|---|---|---|---|
| | #2 | #5 (h < 1.30) | #5 (h ≥ 1.30) | #6 |
| K | 0.0000 | −0.500 | −0.500 | 0.0000 |
| A04 | 8.5000E−04 | −6.4900E−04 | 1.1767E−02 | 3.4870E−02 |
| A06 | 6.6000E−04 | 9.6020E−04 | −3.1890E−03 | −5.6500E−03 |
| A08 | 0.0000E+00 | −8.3440E−04 | 3.0700E−04 | −4.9590E−03 |
| A10 | 0.0000E+00 | 5.9340E−04 | −6.0900E−05 | 2.5000E−03 |
| A12 | 0.0000E+00 | −2.9380E−04 | −1.8560E−04 | −3.7200E−04 |

On the outer area of the front surface #5 of the objective lens 16, a diffracting structure (i.e., a diffractive lens structure) is formed. The diffracting structure is defined by an optical path difference function Φ(h):

$$\Phi(ih) = (P_2 h^2 + P_4 h^4 + P_6 h^6 + \ldots) \times m \times \lambda$$

where $P_2$, $P_4$ and $P_6$ are coefficients of second, fourth and sixth orders, h represents a height from the optical axis of a point on the diffracting structure of the objective lens, m represents a diffraction order, and λ represents a working wavelength. The optical path difference Φ(h) indicates a difference of an optical path length of a hypothetical ray of light which does not pass through the diffracting structure and an optical path length of a ray of light which is diffracted by the diffracting structure, at the height h from the optical axis. In other words, the optical path difference Φ(h) represents the additional optical path length of each ray of light which is diffracted by the diffracting structure.

Table 3 shows values of the coefficients of the optical path difference function Φ(h) applied to the outer area of front surface (#5) of the objective lens 16. In this embodiment (and in the following embodiments) the diffraction order m is 1.

TABLE 3

| Surface No. | #5 (h ≥ 1.30) (outer area) |
|---|---|
| P02 | −6.2640E+00 |
| P04 | 9.4800E+00 |
| P06 | −3.4100E+00 |
| P08 | 0.0000E+00 |

Table 4 shows a numerical structure of the optical system OP2 according to the first embodiment. In Table 4, $M_{ALL2}$ represents a magnification of the entire optical system OP2, and $M_{OBL2}$ represents a magnification of the objective lens 16 in the optical system OP2. In the optical system OP2, a design NA on the image side of the objective lens 16 is 0.65, and a design wavelength (i.e., a wavelength required for the recording/reproducing of the optical disc D2) is 650 nm.

TABLE 4

| | | | | |
|---|---|---|---|---|
| $M_{ALL2}$ | | −0.1456 | | |
| $M_{OBL2}$ | | −0.0000 | | |
| Design Wavelength | | 650 nm | | |
| Design NA | | 0.65 | | |

| Surface No. | r | d | n | ν |
|---|---|---|---|---|
| #0 | | 15.28 | | |
| #1 | 104.000 | 1.20 | 1.544 | 55.7 |
| #2 | −9.400 | 1.00 | | |
| #3 | | 4.00 | 1.516 | 64.2 |
| #4 | | 5.00 | | |
| #5(h < 1.30) | 1.464 | 1.40 | 1.544 | 55.7 |
| #5(h ≧ 1.30) | 1.497 | 1.40 | 1.544 | 55.7 |
| #6 | −6.000 | 1.17 | | |
| #7 | | 0.60 | 1.585 | 29.9 |
| #8 | | — | | |

In Table 4, the character "Surface No." indicates surface numbers that are assigned to optical surfaces in the optical system OP2 starting from the light source 13. The #0 denotes the light source 13. The #1 and #2 denote a front surface (a light source side) and a rear surface 14a (an optical disc side) of the coupling lens 14, respectively. The #3 and #4 denote the light source side surface and the objective lens side surface of the beam splitter 15, respectively.

The #4 and #5 denote the front surface (a light source side) and the rear surface (an optical disc side) of the objective lens 16, respectively. The #7 and #8 denote a surface of the cover layer and a surface of a data recording layer of the optical disc D2, respectively. The front surface (#1) of the coupling lens 14 is a spherical surface.

The rear surface 14a (#2) of the coupling lens 14 is an aspherical surface. The conical coefficient and the aspherical coefficients of the rear surface 14a (#2) of the coupling lens 14 are indicated in Table 5.

TABLE 5

| Surface No. | #2 |
|---|---|
| K | 0.0000 |
| A04 | 1.0670E−04 |
| A06 | 9.5500E−07 |
| A08 | 0.0000E+00 |
| A10 | 0.0000E+00 |
| A12 | 0.0000E+00 |

The light source 11 and the light source 13 have oscillation frequencies equal to the design wavelengths of 780 nm and 650 nm, respectively.

A beam emitted by the light source 11 passes through the coupling lens 12 and then is incident on the beam splitter 15. The coupling lens 12 is configured such that a beam emerging from the rear surface 12a becomes a diverging beam having spherical aberration in which an amount of wavefront delay becomes greater as a distance from its optical axis (i.e., a center axis) increases.

Figure 2:
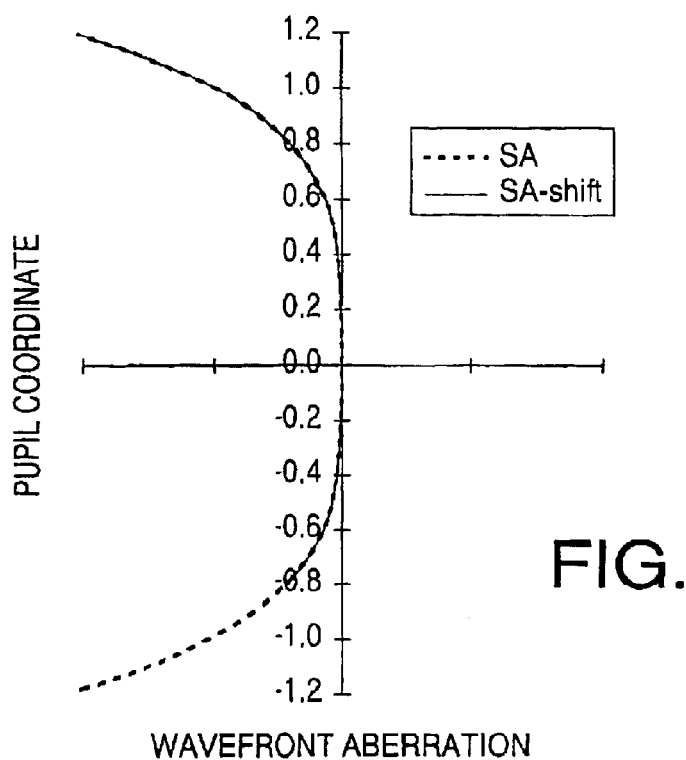
FIG. 2 is a graph illustrating a wavefront aberration of a beam emerged from a coupling lens of for a first optical disc shown in FIG. 1.

FIG. 2 is a graph illustrating a wavefront aberration of the beam emerged from the coupling lens 12. Although the wavefront of the beam emerged from the coupling lens 12 actually has a shape corresponding to a sum of a spherical wave component and an aberration component, in FIG. 2 only the aberration component is indicated for the sake of simplicity. In FIG. 2 (and in similar drawings showing wavefront aberration of a coupling lens), a vertical axis represents a pupil coordinate, and a horizontal axis represents the amount of the wavefront aberration.

As indicated in FIG. 2 by a heavy dashed line, the beam emerged from the coupling lens is given the wavefront aberration which is distributed symmetrically with respect to a central axis of the beam. When the objective lens is situated at a home position, the beam within a range of pupil coordinates of ±1.0 is incident on the objective lens 16.

The beam emerged from the coupling lens 12 is reflected by the beam splitter 15 and then incident on the objected lens 16. When the beam is incident on the objective lens 16 situated at the home position, the beam is converged by the objective lens 16 to form a beam spot having a suitable size on the data recording layer of the optical disc D1.

In the optical system OP2, a beam emitted by the light source 13 is converted to a collimated beam by the coupling lens 14, and then is incident on the objective lens 16 after passing through the beam splitter 15. In the optical system OP2, the coupling lens 14 functions as a collimator lens. The coupling lens 14 gives no aberration to the beam passing therethrough.

When the beam having no aberration is incident on the objective lens 16 situated at the home position, the beam is converged by the objective lens 16 to form a beam spot having a suitable size on the data recording layer of the optical disc D2.

Figure 3:
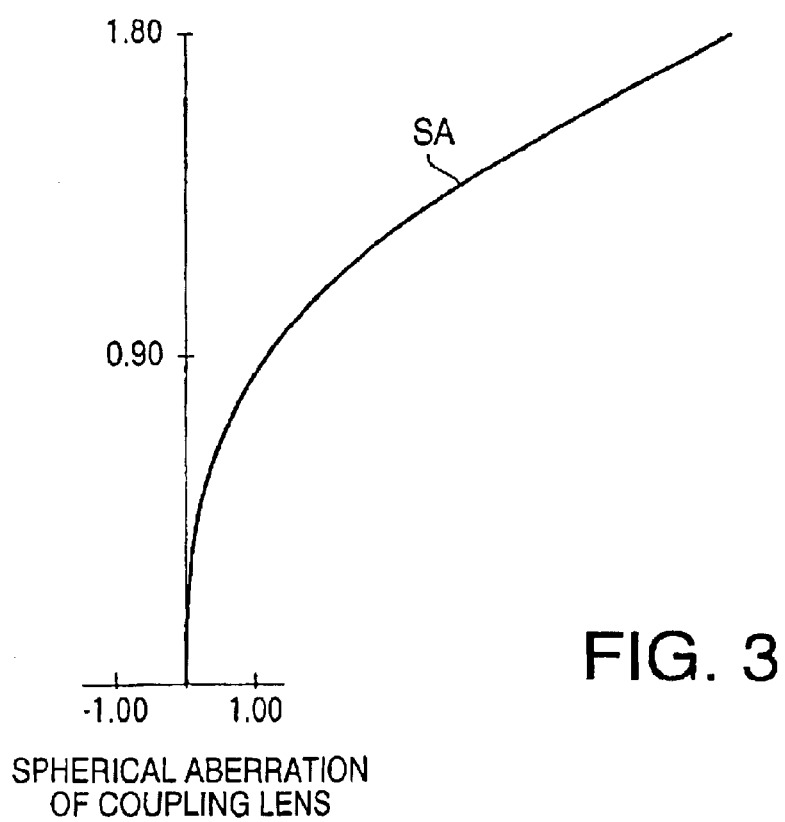
FIG. 3 is a graph illustrating spherical aberration generated by the coupling lens.

As indicated in detail below, the optical system OP1 is configured such that the spherical aberration caused by the coupling lens 12 and the spherical aberration caused by the objective lens 16 and the cover layer of the optical disc D1 cancel each other. FIG. 3 is a graph illustrating the spherical aberration generated by the coupling lens 12. In FIG. 3 (and in the following similar drawings which represent spherical aberrations of coupling lenses), a vertical axis represents a height (unit: mm) from the optical axis on the rear surface 12a of the coupling lens 12, and a horizontal axis represents the amount of the spherical aberration (unit: mm) on a virtual image of the diverging beam. As can be seen from FIG. 3, the spherical aberration caused by the coupling lens 12 is in an overcorrected condition.

In FIG. 3 (and in the following similar drawings which represent spherical aberrations of coupling lenses), although an effective diameter of the rear surface 12a of the coupling lens 12 is 0.90 mm, the graph is shown within a full range of a maximum diameter (1.80 mm) of the rear surface 12a.

The objective lens 16 is configured to have the magnification $M_{OBL1}$ having an absolute value greater than the magnification $M_{REF}$ which makes the spherical aberration on the data recording layer of the optical disc D1 closest to zero (i.e., minimum) when a hypothetical diverging beam equivalent to the diverging beam having no aberration is incident on the objective lens 16. In this embodiment, the $M_{REF}$ is −0.0725, and as shown in Table 1 the $M_{OBL1}$ is −0.0814. Thus, by setting the absolute value of the magnification $M_{OBL1}$ greater than the absolute value of the magnification $M_{REF}$, the spherical aberration generated by the objective lens 16 and the cover layer of the optical disc D1 is set in an undercorrected condition, and a working distance which is a distance from the objective lens 16 to an image formed by the objective lens 16 becomes longer.

Figure 4:
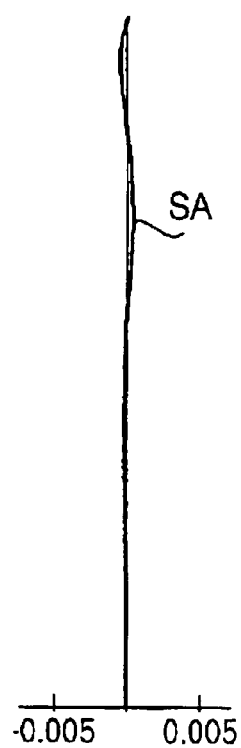
FIG. 4 is a graph illustrating spherical aberration of an entire optical system for the first optical disc.

FIG. 4 is a graph illustrating spherical aberration of the entire optical system OP1. As shown in FIG. 4, the spherical aberration caused by the coupling lens 12 shown in FIG. 3 is sufficiently corrected in the entire optical system OP1.

In the optical system OP2, the objective lens 16 situated at the home position is corrected for its spherical aberration to form a beam spot having a suitable size on the data recording layer of the optical disc D2 when the collimated beam having no aberration emerged from the coupling lens 14 is incident on the objective lens 16.

Next, a configuration for correcting a coma caused in the optical system 100 will be explained. There may be a case where the collimated beam emerged from the coupling lens 14 is incident on the objective lens with a central axis of the collimated beam being inclined with respect to the optical axis of the objective lens 16 due to installation position errors of folding mirrors (not shown) provided on a optical path in the optical system OP1. For this reason, the objective lens 16 is configured to sufficiently correct a coma caused when the collimated beam from the coupling lens 14 is inclined with respect to the optical axis of the objective lens 16.

Similarly to the above mentioned case, there may be a case where the diverging beam is incident on the objective lens 16 with a central axis of the beam being inclined with respect to the optical axis of the objective lens 16. For this reason, the objective lens 16 is preferably configured to sufficiently correct a coma caused when the diverging beam incident on the objective lens 16 is inclined.

It should be noted that an allowable range for the inclination of the incident beam of the objective lens 16 becomes relatively large for the case of the optical system OP1 in comparison with the case of the optical system OP2 because the image side NA required of the objective lens 16 for the recordation/reproduction of the optical disc D1 (e.g., the CD) is smaller than that for the recordation/reproduction of the optical disc D2 (e.g., the DVD).

Accordingly, the accuracy of aberration correction for the diverging beam from the coupling lens 12 required of the objective lens 16 may be set less than the accuracy of aberration correction for the collimated beam from the coupling lens 14 required of the objective lens 16.

The beam reflected from the data recording layer of the optical disc D1 proceeds to the branching optical element 17 along the same optical path as the optical path of the beam proceeding toward the optical disc D1 from the light source 11. The branching optical element 17 has a diffracting structure which directs the beam from the optical disc D1 toward the photoreceptor 18. The photoreceptor 18 generates a electric signal according to the beam incident thereon to send the electric signal to a signal processing unit (not shown) which generates a reproduction signal, a focus error signal, a tracking error signal and the like based on the electric signal form the photoreceptor 18.

The beam reflected from the data recording layer of the optical disc D2 proceeds to the branching optical element 19 along the same optical path as the optical path of the beam proceeding toward the optical disc D2 from the light source 13. The branching optical element 19 has a diffracting structure which directs the beam from the optical disc D2 toward the photoreceptor 20 which has the same function as that of the photoreceptor 18.

When the objective lens 16 laterally shifts from the home position for the tracking operation (i.e., when the objective lens shift occurs), an image of the light source 11 formed by the coupling lens 12 viewed from the objective lens 16 shifts from the optical axis of the objective lens 16. In this case, since the diverging beam from the coupling lens 12 becomes off-axis light for the objective lens 16, a coma is caused by the objective lens 16 and the cover layer of the optical disc D1. For this reason, the optical system 100 according to the embodiment is configured to correct the coma caused by the tracking operation of the objective lens 16.

When the objective lens 16 shifts laterally for the tracking operation, the beam having a range of pupil coordinates of the coupling lens 12 different from the range of pupil coordinates of ±1.0 is incident on the objective lens 16. For example, when the beam having the range of pupil coordinates of +1.2 through −0.8 of the coupling lens 12 is incident on the objective lens 16 due to the tracking operation, the diverging beam incident on the objective lens 16 has distribution of wavefront aberration as indicated by a thin solid line (SA-shift) in FIG. 2. That is, when the objective lens 16 shifts laterally, the distribution of the wavefron aberration of the beam with respect to the objective lens 16 shifts laterally.

Figure 5:
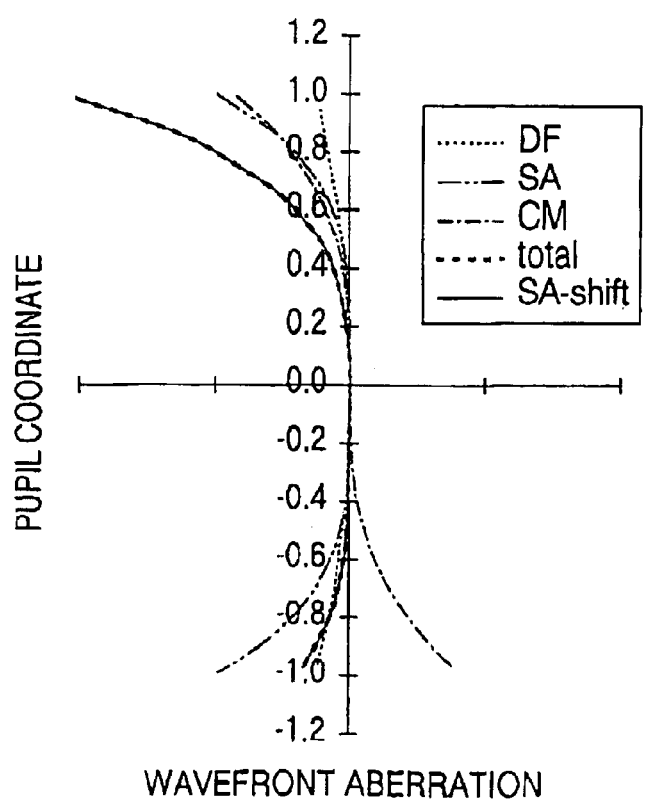
FIG. 5 is a graph illustrating distributions of aberrations of a diverging beam when the diverging beam having laterally shifted wavefront aberration is incident on an objective lens due to tracking operation.

FIG. 5 is a graph illustrating distributions of aberrations of the diverging beam when the diverging beam having the laterally shifted wavefront aberration is incident on the objective lens 16 due to the tracking operation. More specifically, the graph of FIG. 5 is an example when the diverging beam having the range of pupil coordinates of +1.2 through −0.8 of the coupling lens 12 is incident on the objective lens 16.

As shown in FIG. 5, the laterally shifted wavefront aberration can be divided into a coma component (shown by a chain line "CM") and a spherical aberration component (shown by a chain double-dashed line "SA"). In FIG. 5, a thick dashed line "total" represents a total of the aberrations, a solid line "SA-shift" is the same as that shown in FIG. 2. A thin dashed line "DF" is a defocus component which is explained later. These symbols are also applied to the similar drawings which show distributions of aberrations of the laterally shifted wavefront aberration.

As can be seen from the graph of FIG. 2, the spherical aberration caused by the coupling lens 12 has distribution in which a wavefront delay becomes greater as a distance from the central axis of the beam increases. This means that each of the coma component and the spherical aberration component shown in FIG. 5 is opposite in direction to the coma and the spherical aberration caused by the objective lens 16 and the cover layer of the optical disc D1.

Accordingly, even if the objective lens 16 laterally shifts due to the tracking operation, the coma and the spherical aberration caused by the objective lens 16 and the cover layer of the optical disc D1 can be canceled by the laterally shifted spherical aberration component of the diverging beam.

Figure 6:
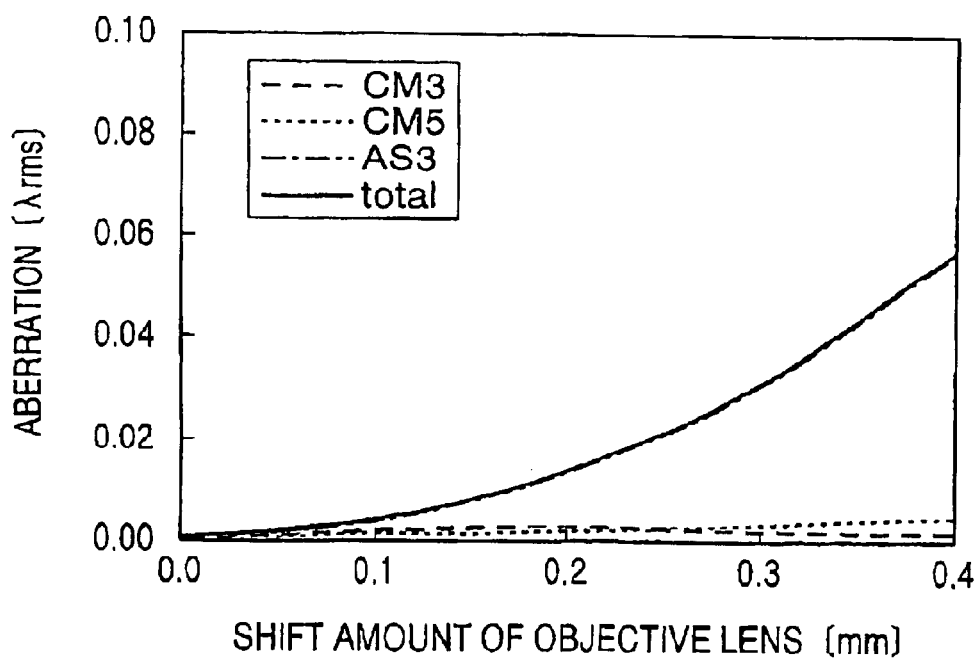
FIG. 6 is a graph illustrating the amounts of aberrations caused in the entire optical system for the first optical disc with respect to a shift amount of the objective lens.

FIG. 6 is a graph illustrating the amounts of aberrations caused in the entire optical system OP1 with respect to a shift amount of the objective lens 16. In FIG. 6, the total amount of the aberrations (total), an astigmatism (AS3), a coma of a fifth order (CM5) and a coma of a third order (CM3) are indicated. These symbols are also applied to similar drawings which show the amounts of aberrations with respect to the shift amount of the objective lens.

As shown in FIG. 6, the comas of low through high orders are effectively suppressed. Accordingly, the beam spot having a suitable size can be formed on the data recording layer of the optical disc D1 even if the objective lens shift occurs.

Figure 7:
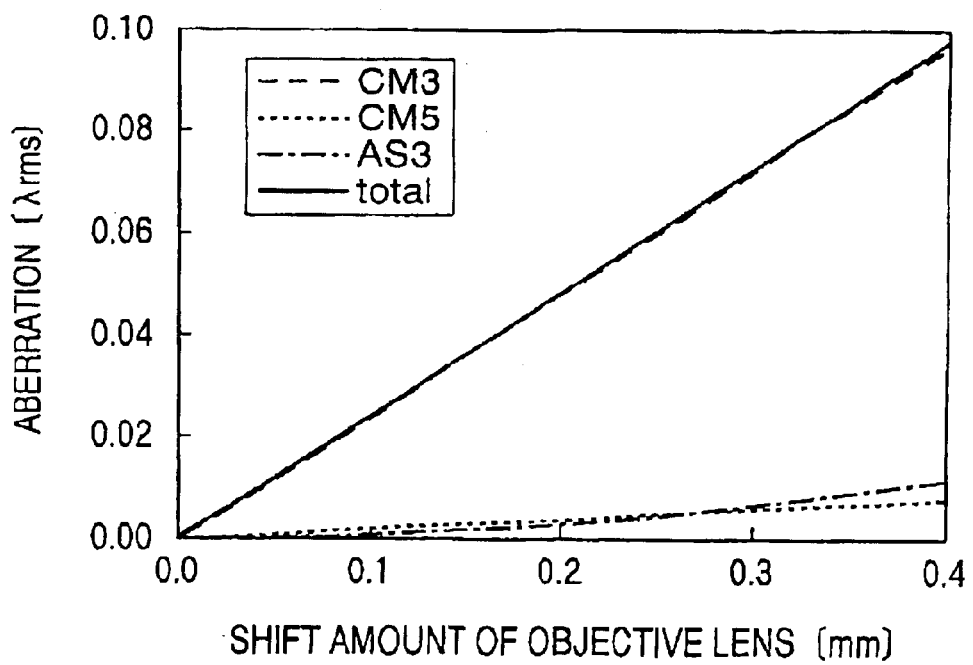
FIG. 7 is a graph Illustrating amounts of aberrations cased in a comparative example of an optical system of an optical pick-up with respect to a shift amount of an objective lens in the comparative example.

For comparison, amounts of aberrations caused in a comparative example of an optical system of an optical pick-up with respect to a shift amount of an objective lens in the comparative example are shown in FIG. 7. This comparative example has the same configuration as the first embodiment except that the coupling lens 12 is corrected its spherical aberration. That is, the comparative example is regarded as a conventional optical system of an optical pick-up.

As can be seen from the comparison between FIG. 6 and FIG. 7, the total aberration of the embodiment is suppressed to less than the total aberration of the comparative example.

It should be noted that when the objective lens 16 laterally shifts due to the tracking operation in the optical system OP2, no additional aberration is caused because the beam incident on the objective lens 16 is the collimated beam.

As mentioned above, in a conventional optical system configured to have a constant magnification for a plurality of types of optical discs, working distances for the plurality of types of the optical discs become different from each other. For example, if the CD and the DVD are used in this conventional optical system, a difference about 0.38 mm is caused between the working distance for the DVD and the working distance for the CD. Such a relatively large difference between working distances for the DVD and the CD makes it difficult to downsize an optical disc device.

The optical system 100 according to the embodiment is configured to sufficiently reduce the difference between working distances for the DVD and the CD as explained below.

In the optical system OP1, the magnification of the objective lens 16 $M_{OBL1}$ satisfies a condition:

$$-0.15 < M_{OBL1} < -0.03 \quad (1).$$

In the optical system OP2, the magnification of the objective lens 16 $M_{OBL2}$ satisfies a condition:

$$-0.01 < M_{OBL2} < 0.01 \quad (2).$$

When the conditions (1) and (2) are satisfied, the difference between the working distances of the DVD and the CD becomes about 0.18 mm which is about half of the difference of the working distances of the DVD and the CD of the conventional optical system.

It should be noted that, by satisfying the condition (1), the diverging beam can be used in the optical system OP1 to perform recording/reproducing operation for the optical disc D1 without increasing the size of the objective lens to be used. By satisfying the condition (2), the collimated beam can be used to perform the recording/reproducing operation for the optical disc D2.

As described above, according to the first embodiment of the invention, the aberrations are effectively suppressed for the plurality of types of the optical discs. This condition is maintained even if the objective lens 16 laterally shifts due to the tracking operation. In addition, according to the first embodiment of the invention, since the difference between the working distances for the plurality of types of the optical discs is sufficiently reduced, the optical system of the embodiment can be mounted on a compact optical pick-up.

Second Embodiment

Next, a second embodiment of the invention will be described. FIG. 8 schematically shows an optical system 200 of an optical pick-up according to the second embodiment of the invention. In FIG. 8, to elements which are similar to those in FIG. 1, the same reference numbers are assigned, and the detailed description thereof will not be repeated. In the optical system 200, a coupling lens 21 is used in place of the coupling lenses 12 and 14 of the first embodiment. The coupling lens 21 is placed on an optical path common to an optical system OP21 for the optical disc D1 (e.g., the CD) and an optical system OP22 for the optical disc D2 (e.g., the DVD).

As shown in FIG. 8, the optical system OP21 for the optical disc D1 includes the light source 11, the branching optical element 17, the beam splitter 15, the coupling lens 21, the objective lens 16 and the photoreceptor 18. The optical system OP22 for the optical disc D2 includes the light source 13, the branching optical element 19, the beam splitter 15, the coupling lens 21, the objective lens 16 and the photoreceptor 20.

Table 6 shows a numerical structure of the optical system OP21 according to the second embodiment. In Table 6, $M_{ALL1}$ represents a magnification of the entire optical system OP21, and $M_{OBL1}$ represents a magnification of the objective lens 16 in the optical system OP21.

TABLE 6

| $M_{ALL1}$ | | | −0.2104 | |
| $M_{OBL1}$ | | | −0.0802 | |
| Design Wavelength | | | 780 nm | |
| Design NA | | | 0.51 | |

| Surface No. | r | d | n | ν |
|---|---|---|---|---|
| #0 | | 3.27 | | |
| #1 | | 3.00 | 1.516 | 64.2 |
| #2 | | 4.00 | | |
| #3 | 104.000 | 1.20 | 1.544 | 55.7 |
| #4 | −9.400 | 5.17 | | |
| #5(h < 1.30) | 1.464 | 1.40 | 1.544 | 55.7 |
| #5(h ≧ 1.30) | 1.497 | 1.40 | 1.544 | 55.7 |
| #6 | −6.000 | 0.99 | | |
| #7 | | 1.20 | 1.585 | 29.9 |
| #8 | | — | | |

In Table 6, #0 denotes the light source 11. The #1 and #2 denote a light source side surface and an objective lens side surface of the beam splitter 15, respectively. The #3 and #4 denote a front surface (a light source side) and a rear surface 21a (an optical disc side) of the coupling lens 21, respectively.

The #5 and #6 denote the front surface (a light source side) and the rear surface (an optical disc side) of the objective lens 16, respectively. The #7 and #8 denote the surface of the cover layer and the surface of the data recording layer of the optical disc D1, respectively. The Other symbols in Table 6 have the same meanings as those shown in Table 1.

Table 7 shows a numerical structure of the optical system OP22 according to the second embodiment. In Table 7, $M_{ALL2}$ represents a magnification of the entire optical system OP22, and $M_{OBL2}$ represents a magnification of the objective lens 16 in the optical system OP22.

TABLE 7

| $M_{ALL2}$ | | | −0.1456 | |
| $M_{OBL2}$ | | | 0.0000 | |
| Design Wavelength | | | 650 nm | |
| Design NA | | | 0.65 | |

| Surface No. | r | d | n | ν |
|---|---|---|---|---|
| #0 | | 9.30 | | |
| #1 | | 3.00 | 1.516 | 64.2 |
| #2 | | 4.00 | | |
| #3 | 104.000 | 1.20 | 1.544 | 55.7 |
| #4 | −9.400 | 5.00 | | |
| #5(h < 1.30) | 1.464 | 1.40 | 1.544 | 55.7 |
| #5(h ≧ 1.30) | 1.497 | 1.40 | 1.544 | 55.7 |
| #6 | −6.000 | 1.17 | | |
| #7 | | 0.60 | 1.585 | 29.9 |
| #8 | | — | | |

In Table 7, #0 denotes the light source 13. The #1 and #2 denote the light source side surface and the objective lens side surface of the beam splitter 15, respectively. The #3 and #4 denote the front surface (a light source side) and the rear surface 21a (an optical disc side) of the coupling lens 21, respectively.

The #5 and #6 denote the front surface (a light source side) and the rear surface (an optical disc side) of the objective lens 16, respectively. The #7 and #8 denote the surface of the cover layer and the surface of the data recording layer of the optical disc D2, respectively. The other symbols in Table 7 have the same meanings as those shown in Table 1.

The rear surface 21a (#4) of the coupling lens 21 is an aspherical surface having a diffracting structure. The diffracting structure of the coupling lens 21 has the function of giving the spherical aberration, in which an amount of wavefront delay becomes greater as a distance from the optical axis increases as shown in FIG. 2, to the beam from the light source 11. Further, the diffracting structure of the coupling lens 21 has the function of correcting the spherical aberration of the beam from the light source 13. The objective lens 16 in the second embodiment has the same configuration as that of the first embodiment. The front surface (#3) of the coupling lens 21 is a spherical surface.

The conical coefficient and the aspherical coefficients of the rear surface 21a (#4) of the coupling lens 21, the front surface (#5) of the objective lens 16 and the rear surface (#6) of the objective lens 16 are indicated in Table 8.

TABLE 8

| | Surface No. | | |
|---|---|---|---|
| | #4 | #5 (h < 1.30) | #5 (h ≧ 1.30) | #6 |
| K | 0.0000 | −0.500 | −0.500 | 0.0000 |
| A04 | −1.7100E−03 | −6.4900E−04 | 1.1767E−02 | 3.4870E−02 |
| A06 | 4.6700E−04 | 9.6020E−04 | −3.1890E−03 | −5.6500E−03 |
| A08 | −2.4700E−04 | −8.3440E−04 | 3.0700E−04 | −4.9590E−03 |
| A10 | 0.0000E+00 | 5.9340E−04 | −6.0900E−05 | 2.5000E−03 |
| A12 | 0.0000E+00 | −2.9380E−04 | −1.8560E−04 | −3.7200E−04 |

Table 9 shows values of the coefficients of the optical path difference function Φ(h) applied to the rear surface 21a (#4) of the coupling lens 21 and the outer area of the front surface (#5) of the objective lens 16.

TABLE 9

| | Surface No. | |
|---|---|---|
| | #4 | #5 (h ≧ 1.30) (outer area) |
| P02 | 0.0000E+00 | −6.2640E+00 |
| P04 | 1.5000E+00 | 9.4800E+00 |
| P06 | 4.0000E−01 | −3.4100E+00 |
| P08 | 2.0000E−01 | 0.0000E+00 |

In the optical system OP21, the light source 11 is located on a coupling lens 21 side with respect to a front focal point of the coupling lens 21. Therefore, the beam from the light source 11 becomes a diverging beam after passing through the coupling lens 21. The light source 13 is located at a front focal point of the coupling lens 21. Therefore, the beam form the light source 13 becomes a collimated beam after passing through the coupling lens 21. That is, in the optical system OP22 the coupling lens 21 functions as a collimator lens.

In the optical system OP21, the diverging beam, which is given the spherical aberration by the coupling lens 21, is converged by the objective lens 16 situated at the home position to form a beam spot having a suitable size on the data recording layer of the optical disc D1.

In the optical system OP22, the collimated beam, which is given no spherical aberration by the coupling lens 21, is converged by the objective lens 16 situated at the home position to form a beam spot having a suitable size on the data recording layer of the optical disc D2.

As indicated in detail below, the optical system OP21 is configured such that the spherical aberration caused by the coupling lens 21 and the spherical aberration caused by the objective lens 16 and the cover layer of the optical disc D1 cancel each other.

FIG. 9 is a graph illustrating the spherical aberration caused by the coupling lens 21. As shown in FIG. 9, an effective diameter h of the rear surface 21a of the coupling lens 21 is 1.06. The magnification $M_{OBL1}$ of the objective lens 16 in the optical system OP21 is −0.0802 (see Table 6), and therefore the absolute value of the magnification $M_{OBL1}$ is greater than the absolute value of the magnification $M_{REF}$. With this structure, the spherical aberration caused by the coupling lens 21 is in the overcorrected condition, and the longer working distance can be secured for the optical disc D1.

FIG. 10 is a graph illustrating spherical aberration of the entire optical system OP21. As shown in FIG. 10, the spherical aberration caused by the coupling lens 21 shown in FIG. 9 is sufficiently corrected in the entire optical system OP21.

In the optical system OP22, the objective lens 16 situated at the home position is corrected for its spherical aberration to form a beam spot having a suitable size on the data recording layer of the optical disc D2 when the collimated beam having no aberration emerged from the coupling lens 21 is incident on the objective lens 16.

Similarly to the first embodiment, the objective lens 16 is configured to sufficiently correct a coma caused by installation position errors of optical components (not shown) located on an optical path between the light source 11 (or 13) and the objective lens 16.

When the objective lens 16 laterally shifts from the home position for the tracking operation, the diverging beam from the coupling lens 21 becomes off-axis light for the objective lens 16. In this case, a coma is caused by the objective lens 16 and the cover layer of the optical disc D1. For this reason, the optical system 200 according to the second embodiment is configured to correct the coma caused by the tracking operation of the objective lens 16 by the same configuration as that shown in the first embodiment.

That is, by utilizing each aberration component of the laterally shifted spherical aberration given to the beam from the coupling lens 21, the total aberration of the entire optical system OP21 is cancelled.

FIG. 11 is a graph illustrating the amounts of aberrations caused in the entire optical system OP21 with respect to the shift amount of the objective lens 16. As shown in FIG. 11, the comas of low through high orders are effectively suppressed. Accordingly, the beam spot having a suitable size can be formed on the data recording layer of the optical disc D1 even if the objective lens shift occurs.

As can be seen from the comparison between FIG. 11 and FIG. 7, the total aberration of the second embodiment is lowered to about half of the total aberration of the conventional optical system of the optical pick-up.

It should be noted that when the objective lens 16 laterally shifts due to the tracking operation in the optical system OP22, no additional aberration is caused because the beam incident on the objective lens 16 is the collimated beam.

As described above, according to the second embodiment of the invention, even if the objective lens 16 laterally shifts due to the tracking operation, the aberrations are effectively suppressed for the plurality of types of the optical discs.

In addition, in the second embodiment the objective lens 16 $M_{OBL1}$ in the optical system OP21 satisfies the condition (1) and the objective lens 16 $M_{OBL2}$ in the optical system OP22 satisfies the condition (2). Therefore, the difference between the working distances for the plurality of types of the optical discs is sufficiently reduced. Also, the second embodiment enables to secure a sufficient working distance for the optical disc having a relatively thick cover layer. Accordingly, the optical system of the second embodiment can be mounted on the compact optical pick-up.

Further, according to the second embodiment, only a single coupling lens (21) is used, manufacturing cost and man-hours for positional adjustment of optical components can be reduced.

Third Embodiment

Next, a third embodiment of the invention will be described. As shown in FIG. 5, the laterally shifted wavefront aberration actually includes a defocus component as well as the coma component and the spherical aberration component as indicated by a thin dashed line DF in FIG. 5. Therefore, when the recordlng/reproducing operation for the optical disc D1 is performed under a condition in which the objective lens 16 is laterally shifted, an astigmatism is caused due to the defocus component of the wavefront aberration of the beam from the coupling lens 12.

FIG. 12 schematically shows an optical system 300 of an optical pick-up according to a third embodiment of the invention. In FIG. 12, to elements which are similar to those of the second embodiment shown in FIG. 8, the same reference numbers are assigned, and the detailed description thereof will not be repeated. The optical system 300 has substantially the same arrangement of optical components as that of the second embodiment.

As indicated below in detail, the optical system 300 according to the third embodiment is configured to reduce the astigmatism caused in an optical system OP31 used for the recording/reproducing operation of the optical disc D1.

As shown in FIG. 12, the optical system OP31 for the optical disc D1 includes the light source 11, the branching optical element 17, the beam splitter 15, a coupling lens 31, the objective lens 16 and the photoreceptor 18. An optical system OP32 for the optical disc D2 includes the light source 13, the branching optical element 19, the beam splitter 15, the coupling lens 31, the objective lens 16 and the photoreceptor 20.

Table 10 shows a numerical structure of the optical system OP31 according to the third embodiment. In Table 10, $M_{ALL1}$ represents a magnification of the entire optical system OP31, and $M_{OBL1}$ represents a magnification of the objective lens 16 in the optical system OP31.

TABLE 10

| | | | |
|---|---|---|---|
| $M_{ALL1}$ | | −0.2090 | |
| $M_{OBL1}$ | | −0.0785 | |
| Design Wavelength | | 780 nm | |
| Design NA | | 0.51 | |

| Surface No. | R | d | n | ν |
|---|---|---|---|---|
| #0 | | 3.36 | | |
| #1 | | 3.00 | 1.516 | 64.2 |
| #2 | | 4.00 | | |
| #3 | 104.00 | 1.20 | 1.544 | 55.7 |
| #4 | −9.400 | 5.18 | | |
| #5(h < 1.30) | 1.464 | 1.40 | 1.544 | 55.7 |
| #5(h ≥ 1.30) | 1.497 | 1.40 | 1.544 | 55.7 |
| #6 | −6.000 | 0.98 | | |
| #7 | | 1.20 | 1.585 | 29.9 |
| #8 | — | | | |

In Table 10, the #3 and #4 denote a front surface (a light source side) and a rear surface 31a (an optical disc side) of the coupling lens 31, respectively. The other symbols in Table 10 have the same meanings as those shown in Table 6 of the second embodiment.

Table 11 shows a numerical structure of the optical system OP32 according to the third embodiment. In Table 11, $M_{ALL2}$ represents a magnification of the entire optical system OP32, and $M_{OBL2}$ represents a magnification of the objective lens 16 in the optical system OP32.

TABLE 11

| | | | |
|---|---|---|---|
| $M_{ALL2}$ | | −0.1456 | |
| $M_{OBL2}$ | | 0.0000 | |
| Design Wavelength | | 650 nm | |
| Design NA | | 0.65 | |

| Surface No. | R | d | n | ν |
|---|---|---|---|---|
| #0 | | 9.30 | | |
| #1 | | 3.00 | 1.516 | 64.2 |
| #2 | | 4.00 | | |
| #3 | 104.00 | 1.20 | 1.544 | 55.7 |
| #4 | −9.400 | 5.00 | | |
| #5(h < 1.30) | 1.464 | 1.40 | 1.544 | 55.7 |
| #5(h ≥ 1.30) | 1.497 | 1.40 | 1.544 | 55.7 |
| #6 | −6.000 | 1.17 | | |
| #7 | | 0.60 | 1.585 | 29.9 |
| #8 | — | | | |

In Table 11, #3 and #4 denote the front surface (a light source side) and the rear surface 31a (an optical disc side) of the coupling lens 31, respectively. The other symbols in Table 11 have the same meanings as those shown in Table 7 of the second embodiment.

The rear surface 31a (#4) of the coupling lens 31 is an aspherical surface having a diffracting structure. The objective lens 16 in the third embodiment has the same configuration as that of the first embodiment. The front surface (#3) of the coupling lens 31 is a spherical surface.

The conical coefficient and the aspherical coefficients of the rear surface 31a (#4) of the coupling lens 31, the front surface (#5) of the objective lens 16 and the rear surface (#6) of the objective lens 16 are indicated in Table 12.

TABLE 12

| | Surface No. | | | |
|---|---|---|---|---|
| | #4 | #5 (h < 1.30) | #5 (h ≥ 1.30) | #6 |
| K | 0.0000 | −0.500 | −0.500 | 0.0000 |
| A04 | −1.2320E−03 | −6.4900E−04 | 1.1767E−02 | 3.4870E−02 |
| A06 | −3.6400E−04 | 9.6020E−04 | −3.1890E−03 | −5.6500E−03 |
| A08 | −1.8900E−04 | −8.3440E−04 | 3.0700E−04 | −4.9590E−03 |
| A10 | 0.0000E+00 | 5.9340E−04 | −6.0900E−05 | 2.5000E−03 |
| A12 | 0.0000E+00 | −2.9380E−04 | −1.8560E−04 | −3.7200E−04 |

Table 13 shows values of the coefficients of the optical path difference function Φ(h) applied to the rear surface 31a (#4) of the coupling lens 31 and the outer area of the front surface (#5) of the objective lens 16.

TABLE 13

| | Surface No. | |
|---|---|---|
| | #4 | #5 (h ≥ 1.30) (outer area) |
| P00 | 0.0000E+00 | −6.2640E+00 |
| P04 | 1.1000E+00 | 9.4800E+00 |
| P06 | 3.2000E−01 | −3.4100E+00 |
| P08 | 1.5000E−01 | 0.0000E+00 |

In the optical system OP31, the coupling lens 31 is configured to cause the relatively small spherical aberration in comparison with the spherical aberration shown in FIG. 9 caused by the coupling lens 21.

FIG. 13 is a graph illustrating the spherical aberration caused by the coupling lens 31. As shown in FIG. 13, an effective diameter h of the rear surface 31a of the coupling lens 31 is 1.07. The magnification $M_{OBL1}$ of the objective lens 16 in the optical system OP31 is −0.0785 (see Table 10), and therefore the absolute value of the magnification $M_{OBL1}$ is greater than the absolute value of the magnification $M_{REF}$. With this structure, the spherical aberration caused by the coupling lens 31 is in an overcorrected condition, and the longer working distance can be secured for the optical disc D1.

FIG. 14 is a graph illustrating spherical aberration of the entire optical system OP31. As shown in FIG. 14, the spherical aberration caused by the coupling lens 31 shown in FIG. 13 is sufficiently corrected in the entire optical system OP31.

FIG. 15 is a graph illustrating the amounts of aberrations caused in the entire optical system OP31 with respect to the shift amount of the objective lens 16. As shown in FIG. 15, although the comas generated in the optical system OP31 of the third embodiment are not reduced to respective levels of the comas of the second embodiment, the comas in the optical system 31 are in an allowable range. Also, the astigmatism is in the allowable range.

As can be seen from the comparison between FIG. 15 and FIG. 7, the total aberration of the third embodiment is lowered to about half of the total aberration of the conventional optical system of the optical pick-up. Accordingly, the optical system 300 of the third embodiment has substantially the same advantages as those of the optical system 200 of the second embodiment.

Further, according to the third embodiment, since the amount of the spherical aberration caused by the coupling lens 31 is lowered, tolerance on an installation position error of the coupling lens increases. Furthermore, in the third embodiment a target amount of the coma is set to a practically allowable level, and is not set to a zero level. Therefore, the astigmatism is sufficiently reduced.

Fourth Embodiment

Next, a fourth embodiment of the invention will be described. FIG. 16 schematically shows an optical system 400 of an optical pick-up according to the fourth embodiment of the invention. In FIG. 16, to elements which are similar to those in FIG. 1, the same reference numbers are assigned, and the detailed description thereof will not be repeated.

As shown in FIG. 16, the optical system 400 includes an optical system OP41 which is used to record/reproduce data to/from the optical disc D1 (e.g., the CD), and an optical system OP42 which is used to record/reproduce data to/from the optical disc D2 (e.g., the DVD).

The optical system OP41 includes the light source 11, the branching optical element 17, a coupling lens 412, the beam splitter 15, the objective lens 16 and the photoreceptor 18. The optical system OP42 includes the light source 13, the branching optical element 19, a coupling lens 414, the beam splitter 15, the objective lens 16 and the photoreceptor 20. The beam splitter 15 and the objective lens 16 are used both in the optical systems OP41 and OP42.

Table 14 shows a numerical structure of the optical system OP41 according to the fourth embodiment. In Table 14, $M_{ALL1}$ represents a magnification of the entire optical system OP41, $M_{OBL1}$ represents a magnification of the objective lens 16 in the optical system OP41, and $M_{REF}$ represents a magnification of the objective lens 16 which makes the spherical aberration on the data recording layer of the optical disc D1 closest to zero when the hypothetical diverging beam equivalent to the diverging beam having no aberration is incident on the objective lens 16. In the optical system OP41, a design NA on the image side of the objective lens 16 is 0.51, and a design wavelength is 780 nm. A focal length f of the coupling lens 412 is 16.14 mm.

TABLE 14

| | | | | |
|---|---|---|---|---|
| $M_{ALL1}$ | | | | −0.1929 |
| f | | | | 16.14 mm |
| $M_{REF}$ | | | | −0.0725 |
| $M_{OBL1}$ | | | | −0.0814 |
| Design Wavelength | | | | 780 nm |
| Design NA | | | | 0.51 |
| Surface No. | r | d | n | ν |
| #0 | | 7.35 | | |
| #1 | −4.530 | 1.20 | 1.544 | 55.7 |
| #2 | −3.250 | 2.37 | | |
| #3 | | 4.00 | 1.516 | 64.2 |
| #4 | | 5.20 | | |
| #5(h < 1.30) | 1.464 | 1.40 | 1.544 | 55.7 |
| #5(h ≧ 1.30) | 1.497 | 1.40 | 1.544 | 55.7 |
| #6 | −6.000 | 0.99 | | |
| #7 | | 1.20 | 1.585 | 29.9 |
| #8 | | — | | |

In Table 14, #1 and #2 denote a front surface 412a (a light source side) and a rear surface 412b (an optical disc side) of the coupling lens 412. The other symbols in Table 14 have the same meanings as those shown in Table 1.

As shown in Table 14, the front surface (#5) of the objective lens 16 includes the inner area formed within a height from the optical axis smaller than 1.30 mm and the outer area formed outside the inner area. The inner area and the outer area are configured to have different structures.

The inner area of the front surface (#5) of the objective lens 16 is a continuous surface having no diffracting structure. The outer area of the front surface (#5) of the objective lens 16 has a diffracting structure. The front surface 412a (#1) of the coupling lens 412 is a spherical surface.

The rear surface 412b. (#2) of the coupling lens 412, the front surface (#5) of the objective lens 16 and the rear surface (#6) of the objective lens 16 are rotationally-symmetrical aspherical surfaces.

The conical coefficient and the aspherical coefficients of the rear surface 412b (#2) of the coupling lens 412, the front surface (#5) of the objective lens 16 and the rear surface (#6) of the objective lens 16 are indicated in Table 15.

TABLE 15

| | Surface No. | | | |
|---|---|---|---|---|
| | #2 | #5 (h < 1.30) | #5 (h ≧ 1.30) | #6 |
| K | 0.0000 | −0.500 | −0.500 | 0.0000 |
| A04 | 1.6000E−03 | −6.4900E−04 | 1.1767E−02 | 3.4870E−02 |
| A06 | 5.0000E−04 | 9.6020E−04 | −3.1890E−03 | −5.6500E−03 |
| A08 | 3.5000E−04 | −8.3440E−04 | 3.0700E−04 | −4.9590E−03 |
| A10 | 0.0000E+00 | 5.9340E−04 | −6.0900E−05 | 2.5000E−03 |
| A12 | 0.0000E+00 | −2.9380E−04 | −1.8560E−04 | −3.7200E−04 |

In the optical system OP41, the coupling lens 412 has an aspheric amount of the rear surface 412b (#2) of 1.08 μm at a maximum effective diameter of the rear surface 412b.

Table 16 shows values of the coefficients of the optical path difference function Φ(h) applied to the outer area of front surface (#5) of the objective lens 16. In this embodiment (and in the following embodiments), the diffraction order m is 1.

TABLE 16

| Surface No. | #1 (h ≥ 1.30) (outer area) |
|---|---|
| P02 | −6.2640E+00 |
| P04 | 9.4800E+00 |
| P06 | −3.4100E+00 |

Table 17 shows a numerical structure of the optical system OP42 according to the fourth embodiment. In Table 17, $M_{ALL2}$ represents a magnification of the entire optical system OP42, and $M_{OBL2}$ represents a magnification of the objective lens 16 in the optical system OP42. In the optical system OP42, a design NA on the image side of the objective lens 16 is 0.65, and a design wavelength is 650 nm. A focal length f of the coupling lens 414 is 16.00 mm.

TABLE 17

| $M_{ALL2}$ | | −0.1456 | |
|---|---|---|---|
| f | | 16.00 mm | |
| $M_{OBL2}$ | | 0.0000 | |
| Design Wavelength | | 650 nm | |
| Design NA | | 0.65 | |

| Surface No. | r | d | n | ν |
|---|---|---|---|---|
| #0 | | 13.93 | | |
| #1 | −4.530 | 1.20 | 1.544 | 55.7 |
| #2 | −3.250 | 1.00 | | |
| #3 | | 4.00 | 1.516 | 64.2 |
| #4 | | 5.00 | | |
| #5(h < 1.30) | 1.464 | 1.40 | 1.544 | 55.7 |
| #5(h ≥ 1.30) | 1.497 | 1.40 | 1.544 | 55.7 |
| #6 | −6.000 | 1.17 | | |
| #7 | | 0.60 | 1.585 | 29.9 |
| #8 | | — | | |

The front surface 414a (#1) of the coupling lens 414 is a spherical surface. The rear surface 414b (#2) of the coupling lens 414 is an aspherical surface. The conical coefficient and the aspherical coefficients of the rear surface 414b (#2) of the coupling lens 414 are indicated in

TABLE 18

| Surface No. | #2 |
|---|---|
| K | 0.0000 |
| A04 | 1.5080E−03 |
| A06 | 1.1360E−04 |
| A08 | 7.2840E−06 |
| A10 | 9.5820E−07 |
| A12 | 0.0000E+00 |

FIG. 17 is a graph illustrating wavefront aberration of the beam emerged from the coupling lens 412. Although the wavefront of the beam emerged from the coupling lens 412 actually has a shape corresponding to a sum of a spherical wave component and an aberration component, in FIG. 17 only the aberration component is indicated for the sake of simplicity.

As indicated in FIG. 17 by a heavy dashed line "SA", the beam emerged from the coupling lens 412 is given the wavefront aberration which is distributed symmetrically with respect to a central axis of the beam. When the objective lens 16 is situated at the home position, the beam within a range of pupil coordinates of ±1.0 is incident on the objective lens 16.

The coupling lens 412 is a meniscus lens which has a convex surface on the optical disk side and has positive power. The coupling lens 412 is configured to satisfy a condition:

$$1.0 < (Ra+Rb)/(Ra-Rb) < 15.0 \quad (3)$$

where Ra represents a radius of curvature of the front surface 412a of the coupling lens 412, and Rb represents a radius of curvature of the rear surface 412b of the coupling lens 412.

By satisfying the condition (3), a coma caused by a shift of the coupling lens 412 (i.e., decentering of the coupling lens in a plane substantially perpendicular to the optical axis of the coupling lens) can be canceled by a coma which the objective lens 16 generates when off-axis light is incident on the objective lens 16 due to the shift of the coupling lens 412. As shown in Table 14, (Ra+Rb)/(Ra−Rb) of the coupling lens 412 is 6.078 in this embodiment, the coupling lens 412 satisfies the condition (3).

In the optical system OP41, an absolute value of the magnification $M_{OBL1}$ is set greater than an absolute value of the magnification $M_{REF}$ so that the spherical aberration generated by the objective lens 16 and the cover layer of the optical disc D1 is set in the undercorrected condition and that the relatively long working distance can be secured.

If the absolute value of the magnification $M_{OBL1}$ is set excessively greater than the absolute value of the magnification $M_{REF}$, the spherical aberration caused by the objective lens 16 becomes too large. This means that the coma caused by the objective lens 16 when the coupling lens 412 is shifted also becomes too large. In such a case, the coupling lens 412 is required to have a large radius of curvature in order to suppress the coma.

For the above mentioned reason, the coupling lens 412 and the objective lens 16 are configured to satisfy conditions:

$$0.15 < (-Rb/f) \times (M_{OBL1}/M_{REF})^4 < 0.55 \quad (4)$$

$$1.02 < M_{OBL1}/M_{REF} < 1.05 \quad (5).$$

By satisfying the conditions (4) and (5), the coma caused by the shift of the coupling lens 412 is effectively suppressed even if the absolute value of the magnification $M_{OBL1}$ is set greater than the absolute value of the magnification $M_{REF}$.

According to Table 14, in the optical system OP41. $\{(-Rb/f) \times (M_{OBL1}/M_{REF})^4\}$ is 0.301. Therefore, the optical system 41 satisfies the conditions (4).

FIG. 18 is a graph illustrating the amounts of aberrations caused in the entire optical system OP41 with respect to a shift amount of the coupling lens 412. In FIG. 18 (and in similar drawings which show the amounts of aberrations with respect to the shift amount of the coupling lens), the total amount of the aberrations (total), an astigmatism (AS3), a coma of a fifth order (CM5) and a coma of a third order (CM3) are indicated.

As can be seen from FIG. 18, the comas of low through high orders are effectively suppressed. For example, the comas stay within 0.10 λrms even if the coupling lens 412 shifts by 0.10 mm. That is, the optical system OP 41 which satisfies the conditions (3) and (4) is able to correct the coma caused by the shift of the coupling lens 412 and the shift of the objective lens 16.

The diverging beam emerged from the coupling lens 412 and having the spherical aberration shown in FIG. 17 is converged by the objective lens 16 situated at the home position on the data recording surface of the optical disc D1. Further, the optical system OP41 is configured such that the spherical aberration of the diverging beam from the coupling lens 412 and the spherical aberration generated by the objective lens 16 and the cover layer of the optical disc D1 cancel each other. Further, the coma caused by the shift of the coupling lens 412 is sufficiently corrected. Accordingly, by the optical system OP41, a suitable beam spot can be formed on the data recording layer of the optical disc D1.

FIG. 19 is a graph illustrating the spherical aberration generated by the coupling lens 412. As can be seen from FIG. 19, the spherical aberration generated by the coupling lens 412 is in the overcorrected condition. The effective diameter of the rear surface 412b of the coupling lens 412 is 1.07 mm.

FIG. 20 is a graph illustrating the spherical aberration in the entire optical system OP41. According to Table 14, $M_{OBL1}/M_{REF}=1.11$ (i.e., the $M_{OBL1}$ is larger than the $M_{REF}$). In this case, the spherical aberration caused by the objective lens 16 and the cover layer of the optical disc D1 is in the undercorrected condition. Therefore, as shown in FIG. 20, the spherical aberration caused by the coupling lens 412 is canceled by the spherical aberration caused by the objective lens 16 and the cover layer of the optical disc D1.

In the optical system OP42, a beam emitted by the light source 13 is converted to a collimated beam by the coupling lens 414, and then is incident on the objective lens 16 after passing through the beam splitter 15. In the optical system OP42, the coupling lens 414 functions as a collimator lens. The coupling lens 414 gives no aberration to the beam passing therethrough.

When the beam having no aberration is incident on the objective lens 16 situated at the home position, the beam is converged by the objective lens 16 to form a beam spot having a suitable size on the data recording layer of the optical disc D2.

In the optical system OP42, the objective lens 16 situated at the home position is corrected for its spherical aberration to form a beam spot having a suitable size on the data recording layer of the optical disc D2 when the collimated beam having no aberration emerged from the coupling lens 414 is incident on the objective lens 16.

The optical system 400 of the fourth embodiment is configured to suppress the coma caused by installation position errors of optical components such as a folding mirror placed on an optical path of the collimated beam from the coupling lens 414. Since a configuration for suppressing such a coma is substantially the same as that of the first embodiment, an explanation thereof is not repeated.

Also, the optical system 400 is configured to suppress a coma caused when the objective lens 16 is laterally shifted for the tracking operation. Since a configuration for suppressing the coma caused by the objective lens shift is substantially the same as that of the first embodiment, an explanation thereof is not repeated.

Similarly to FIG. 5 of the first embodiment, FIG. 21 is a graph illustrating distributions of aberrations of the diverging beam when the diverging beam having the laterally shifted wavefront aberration is incident on the objective lens 16 due to the tracking operation. More specifically, the graph of FIG. 21 is an example when the range of pupil coordinates of +1.2 through −0.8 of the coupling lens 412 is incident on the objective lens 16.

Similarly to FIG. 6 of the first embodiment, FIG. 22 is a graph illustrating the amounts of aberrations caused in the entire optical system OP41 with respect to a shift amount of the objective lens 16. Similarly to FIG. 7 of the first embodiment, FIG. 23 is a graph illustrating amounts of aberrations cased in a comparative example of an optical system of an optical pick-up with respect to a shift amount of an objective lens in the comparative example.

As can be seen from the comparison between FIG. 22 and FIG. 23, the total aberration of the embodiment is suppressed less than the total aberration of the conventional optical system of the optical pick-up.

It should be noted that when the objective lens 16 laterally shifts due to the tracking operation in the optical system OP42, no additional aberration is caused because the beam incident on the objective lens 16 is the collimated beam.

Furthermore, similarly to the first embodiment, in the optical system OP41 the magnification $M_{OBL1}$ of the objective lens 16 satisfies the above mentioned condition (1):

$$-0.15 < M_{OBL1} < -0.03 \quad (1),$$

and in the optical system OP42 the magnification of the objective lens 16 $M_{OBL2}$ satisfies the above mentioned condition:

$$-0.01 < M_{OBL2} < 0.01 \quad (2).$$

When the conditions (1) and (2) are satisfied, the difference between the working distances of the DVD and the CD becomes about 0.18 mm which is about half of the difference of the working distances of the DVD and the CD of the conventional optical system. That is, a sufficient working distance is secured for the optical disc having a relatively thick cover layer as well as the optical disc having a relatively thin cover layer.

As described above, according to the fourth embodiment of the invention, the aberrations are effectively suppressed for the plurality of types of he optical discs. This condition is maintained even if the objective lens 16 laterally shifts due to the tracking operation and/or even if the coupling lens laterally shifts. In addition, according to the fourth embodiment of the invention, since the difference between the working distances for the plurality of types of the optical discs is sufficiently reduced, the optical system of the embodiment can be mounted on a compact optical pick-up.

Fifth Embodiment

Next, a fifth embodiment of the invention will be described. Since an arrangement of optical components of an optical system of the fifth embodiment is substantially the same as that of the fourth embodiment, the optical system of this embodiment is explained with reference to the arrangement (i.e., reference numbers) shown in FIG. 16 and hereafter only a numeral structure of the fifth embodiment will be explained in detail.

Tables 19 and 20 show numerical structures of the optical system OP41 and the optical system OP42 according to the fifth embodiment, respectively. Symbols in Tables 19 and 20 have the same meanings as those shown in Tables 14 and 17, respectively.

TABLE 19

| $M_{ALL1}$ | | −0.1929 | | |
| f | | 16.12 mm | | |
| $M_{REF}$ | | −0.0725 | | |
| $M_{OBL1}$ | | −0.0749 | | |
| Design Wavelength | | 780 nm | | |
| Design NA | | 0.51 | | |

| Surface No. | r | d | n | ν |
| --- | --- | --- | --- | --- |
| #0 | | 8.79 | | |
| #1 | −21.120 | 1.20 | 1.544 | 55.7 |
| #2 | −6.260 | 0.55 | | |
| #3 | | 4.00 | 1.516 | 64.2 |
| #4 | | 5.20 | | |
| #5(h < 1.30) | 1.464 | 1.40 | 1.544 | 55.7 |
| #5(h ≥ 1.30) | 1.497 | 1.40 | 1.544 | 55.7 |
| #6 | −6.000 | 0.98 | | |

TABLE 19-continued

| #7 | | 1.20 | 1.585 | 29.9 |
|---|---|---|---|---|
| #8 | | — | | |

TABLE 20

| $M_{ALL2}$ | | −0.1456 | | |
|---|---|---|---|---|
| f | | 16.00 mm | | |
| $M_{OBL2}$ | | 0.0000 | | |
| Design Wavelength | | 650 nm | | |
| Design NA | | 0.65 | | |

| Surface No. | r | d | n | ν |
|---|---|---|---|---|
| #0 | | 14.92 | | |
| #1 | −21.120 | 1.20 | 1.544 | 55.7 |
| #2 | −6.260 | 1.00 | | |
| #3 | | 4.00 | 1.516 | 64.2 |
| #4 | | 5.00 | | |
| #5(h < 1.30) | 1.464 | 1.40 | 1.544 | 55.7 |
| #5(h ≧ 1.30) | 1.497 | 1.40 | 1.544 | 55.7 |
| #6 | −6.000 | 1.17 | | |
| #7 | | 0.60 | 1.585 | 29.9 |
| #8 | | — | | |

The-rear-surface 412b of the coupling lens 412 and the rear surface 414b of the coupling lens 414 are aspherical surfaces. The conical coefficient and the aspherical coefficients of the rear surface 412b of the coupling lens 412 and the rear surface 414b of the coupling lens 414 are indicated in Tables 21 and 22, respectively.

TABLE 21

| Surface No. | #2 |
|---|---|
| K | 0.0000 |
| A04 | 3.0000E−04 |
| A06 | 1.2000E−05 |
| A08 | 8.2400E−06 |
| A10 | 0.0000E+00 |
| A12 | 0.0000E+00 |

TABLE 22

| Surface No. | #2 |
|---|---|
| K | 0.0000 |
| A04 | 2.1650E−04 |
| A06 | 4.3700E−06 |
| A08 | 8.6000E−08 |
| A10 | 0.0000E+00 |
| A12 | 0.0000E+00 |

In the optical system OP41, the coupling lens 412 has an aspheric amount of the rear surface 412b (#2) of 1.93 μm at a maximum effective diameter of the rear surface 412b.

The objective lens 16 of the fifth embodiment has the same configuration as that of the fourth embodiment, and therefore an explanation thereof is not repeated.

The optical system OP41 of the fifth embodiment is configured such that the spherical aberration given by the coupling lens 412 to the diverging beam incident on the objective lens 16 and the spherical aberration caused by the objective lens 16 and the cover layer of the optical disc D1 cancel each other. FIG. 24 is a graph illustrating the spherical aberration caused by the coupling lens 412.

According to values of the numerical structure of the coupling lens 412 shown in Table 19, (Ra+Rb)/(Ra−Rb)= 1.843, (−Rb/f)×$(M_{OBL1}/M_{REF})^4$=0.441, and $M_{OBL1}/M_{REF}$= 1.03. Therefore, the optical system 400 of the fifth embodiment satisfies the conditions (3)–(5).

FIG. 25 is a graph illustrating the amounts of aberrations caused in the entire optical system OP41 with respect to a shift amount of the coupling lens 412. As can be seen from FIG. 25, the comas of low through high orders are effectively suppressed. For example, the comas stay within 0.06 λrms even if the coupling lens 412 shifts by 0.10 mm. That is, the optical system OP 41 which satisfies the conditions (3), (4) and (5) is able to correct the coma caused by the coupling lens 412 and the objective lens 16 when the coupling lens 412 is shifted.

By satisfying the condition (5), the spherical aberration caused by the objective lens 16 and the cover layer of the optical disc D1 is set in the undercorrected direction. FIG. 26 shows a graph illustrating the total spherical aberration in the optical system OP41. Since as described above the coupling lens 412 causes the spherical aberration shown in FIG. 24, the total spherical aberration in the optical system OP41 can be reduced sufficiently as shown in FIG. 26.

Since, according to numerical data shown in Tables 19 and 20, the optical system 400 of the fifth embodiment satisfies the conditions (1) and (2) as well as the condition (5), the difference between the working distances of the DVD and the CD can be lowered sufficiently. A sufficient working distance is secured for the optical disc having a relatively thick cover layer as well as the optical disc having a relatively thin cover layer.

The optical system 400 of the fifth embodiment is configured to suppress a coma caused when the objective lens 16 is laterally shifted for the tracking operation. Since a configuration for suppressing the coma caused by the lateral shift of the objective lens 16 is substantially the same as that of the first embodiment, an explanation thereof is not repeated.

Similarly to FIG. 22 of the fourth embodiment, FIG. 27 is a graph illustrating the amounts of aberrations caused in the entire optical system OP41 with respect to a shift amount of the objective lens 16. As can be seen from the comparison between FIG. 27 and FIG. 23, the total aberration of the fifth embodiment is suppressed to less than the total aberration of the conventional optical system of the optical pick-up. In FIG. 27, the coma is suppressed to less than 0.08 λrms when the shift amount of the objective lens 16 is 0.4 mm. That is, the coma caused in the optical system 400 of the fifth embodiment is lowered by about 20% relative to the coma of the conventional optical system of the optical pick-up.

It should be noted that when the objective lens 16 laterally shifts due to the tracking operation in the optical system OP42, no additional aberration is caused because the beam incident on the objective lens 16 is the collimated beam.

Sixth Embodiment

Next, a sixth embodiment of the invention will be described. Since an arrangement of optical components of an optical system of the sixth embodiment is substantially the same as that of the fourth embodiment, the optical system of this embodiment is explained with reference to the arrangement (i.e., reference numbers) shown in FIG. 16 and hereafter only a numeral structure of the sixth embodiment will be explained in detail.

Tables 23 and 24 show numerical structures of the optical system OP41 and the optical system OP42 according to the sixth embodiment, respectively.

TABLE 23

| | | | | |
|---|---|---|---|---|
| $M_{ALL1}$ | | −0.1929 | | |
| f | | 16.09 mm | | |
| $M_{REF}$ | | −0.0725 | | |
| $M_{OBL1}$ | | −0.0749 | | |
| Design Wavelength | | 780 nm | | |
| Design NA | | 0.51 | | |

| Surface No. | r | d | n | ν |
|---|---|---|---|---|
| #0 | | 7.39 | | |
| #1 | −3.420 | 1.20 | 1.544 | 55.7 |
| #2 | −2.750 | 2.26 | | |
| #3 | | 4.00 | 1.516 | 64.2 |
| #4 | | 5.20 | | |
| #5(h < 1.30) | 1.464 | 1.40 | 1.544 | 55.7 |
| #5(h ≥ 1.30) | 1.497 | 1.40 | 1.544 | 55.7 |
| #6 | −6.000 | 0.98 | | |
| #7 | | 1.20 | 1.585 | 29.9 |
| #8 | — | | | |

TABLE 24

| | | | | |
|---|---|---|---|---|
| $M_{ALL2}$ | | −0.1462 | | |
| f | | 15.94 mm | | |
| $M_{OBL2}$ | | 0.0000 | | |
| Design Wavelength | | 650 nm | | |
| Design NA | | 0.65 | | |

| Surface No. | r | d | n | ν |
|---|---|---|---|---|
| #0 | | 13.50 | | |
| #1 | −3.420 | 1.20 | 1.544 | 55.7 |
| #2 | −2.750 | 1.00 | | |
| #3 | | 4.00 | 1.516 | 64.2 |
| #4 | | 5.00 | | |
| #5(h < 1.30) | 1.464 | 1.40 | 1.544 | 55.7 |
| #5(h ≥ 1.30) | 1.497 | 1.40 | 1.544 | 55.7 |
| #6 | −6.000 | 1.17 | | |
| #7 | | 0.60 | 1.585 | 29.9 |
| #8 | — | | | |

The rear surface 412b (#2) of the coupling lens 412 and the rear surface 414b of the coupling lens 414 are aspherical surfaces. The conical coefficient and the aspherical coefficients of the rear surface 412b of the coupling lens 412 and the rear surface 414b of the coupling lens 414 are indicated in Tables 25 and 26, respectively.

TABLE 25

| Surface No. | #2 |
|---|---|
| K | 0.0000 |
| A04 | 1.7000E−03 |
| A06 | 2.2000E−04 |
| A08 | 3.5000E−05 |
| A10 | 0.0000E+00 |
| A12 | 0.0000E+00 |

TABLE 26

| Surface No. | #2 |
|---|---|
| K | 0.0000 |
| A04 | 2.3960E−03 |
| A06 | 2.5710E−04 |
| A08 | 1.9130E−05 |

TABLE 26-continued

| Surface No. | #2 |
|---|---|
| A10 | 5.2410E−06 |
| A12 | 0.0000E+00 |

In the optical system OP41, the coupling lens 412 has an aspheric amount of the rear surface 412b (#2) of 1.16 μm at a maximum effective diameter of the rear surface 412b.

The objective lens 16 of the sixth embodiment has the same configuration as that of the fourth embodiment, and therefore an explanation thereof is not repeated.

The optical system OP41 of the sixth embodiment is configured such that the spherical aberration given by the coupling lens 412 to the diverging beam incident on the objective lens 16 and the spherical aberration generated by the objective lens 16 and the cover layer of the optical disc D1 cancel each other. FIG. 28 is a graph illustrating the spherical aberration caused by the coupling lens 412 of the sixth embodiment.

According to values of the numerical structure of the coupling lens 412 shown in Table 23, (Ra+Rb)/(Ra−Rb)= 9.209, $(-Rb/f) \times (M_{OBL1}/M_{REF})^4 = 0.194$, and $M_{OBL1}/M_{REF} = 1.03$. Therefore, the optical system 400 of the sixth embodiment satisfies the conditions (3)–(5).

FIG. 29 is a graph illustrating the amounts of aberrations caused in the entire optical system OP41 with respect to a shift amount of the coupling lens 412. As can be seen from FIG. 29, the comas of low through high orders are effectively suppressed. For example, the comas stay within 0.04 λrms even if the coupling lens 412 shifts by 0.10 mm. That is, the optical system OP 41 which satisfies the conditions (3), (4) and (5) is able to correct the coma generated by the coupling lens 412 and the objective lens 16 when the coupling lens 412 is shifted.

By satisfying the condition (5), the spherical aberration caused by the objective lens 16 and the cover layer of the optical disc D1 is set in the undercorrected direction. FIG. 30 shows a graph illustrating the total spherical aberration in the optical system OP41. Since as described above the coupling lens 412 generates the spherical aberration shown in FIG. 28, the total spherical aberration in the optical system OP41 can be reduced sufficiently as shown in FIG. 30.

Since, according to numerical data shown in Tables 23 and 24, the optical system 400 of the sixth embodiment satisfies the conditions (1) and (2) as well as the condition (5), the difference between the working distances of the DVD and the CD can be lowered sufficiently. A sufficient working distance is secured for the optical disc having a relatively thick cover layer as well as the optical disc having a relatively thin cover layer.

The optical system 400 of the sixth embodiment is configured to suppress a coma caused when the objective lens 16 is laterally shifted for the tracking operation. Since a configuration for suppressing the coma caused by the lateral shift of the objective lens 16 is substantially the same as that of the first embodiment, an explanation thereof is not repeated.

Similarly to FIG. 22 of the fourth embodiment, FIG. 31 is a graph illustrating the amounts of aberrations caused in the entire optical system OP41 with respect to a shift amount of the objective lens 16. As can be seen from the comparison between FIG. 31 and FIG. 23, the total aberration of the sixth embodiment is suppressed to less than the total aberration of the conventional optical system of the optical pick-up. In FIG. 31, the coma is suppressed to less than 0.08 λrms when the shift amount of the objective lens 16 is 0.4 mm. That is, the coma caused in the optical system 400 of the sixth embodiment is lowered by about 20% relative to the coma of the conventional optical system of the optical pick-up.

It should be noted that when the objective lens 16 laterally shifts due to the tracking operation in the optical system OP42, no additional aberration is caused because the beam incident on the objective lens 16 is the collimated beam.

Seventh Embodiment

Next, a seventh embodiment of the invention will be described. FIG. 32 schematically shows an optical system 700 of an optical pick-up according to the seventh embodiment of the invention. In FIG. 32, to elements which are similar to those of the fourth embodiment shown in FIG. 16, the same reference numbers are assigned, and the detailed description thereof will not be repeated.

In the optical system 700, a coupling lens 721 common to both of optical paths from the light source 11 and from the light source 13 is used in place of the coupling lens lenses 412 and 414 in the optical system 400 of the fourth embodiment.

Tables 27 and 28 show numerical structures of the optical system OP71 and the optical system OP72 according to the seventh embodiment, respectively.

TABLE 27

| $M_{ALL1}$ | | -0.1929 | | |
|---|---|---|---|---|
| f | | 16.12 mm | | |
| $M_{REF}$ | | -0.0725 | | |
| $M_{OBL1}$ | | -0.0749 | | |
| Design Wavelength | | 780 nm | | |
| Design NA | | 0.51 | | |
| Surface No. | r | d | n | ν |
| #0 | | 4.02 | | |
| #1 | | 4.00 | 1.516 | 64.2 |
| #2 | | 1.50 | | |
| #3 | -6.660 | 1.20 | 1.544 | 55.7 |
| #4 | -4.000 | 9.10 | | |
| #5(h < 1.30) | 1.464 | 1.40 | 1.544 | 55.7 |
| #5(h ≥ 1.30) | 1.497 | 1.40 | 1.544 | 55.7 |
| #6 | -6.000 | 0.98 | | |
| #7 | | 1.20 | 1.585 | 29.9 |
| #8 | | — | | |

In Table 27, #0 denotes the light source 11. The #1 and #2 denote a light source side surface and an objective lens side surface of the beam splitter 15, respectively. The #3 and #4 denote a front surface (a light source side) and a rear surface 721a (an optical disc side) of the coupling lens 721, respectively. The #5 and #6 denote the front surface (a light source side) and the rear surface (an optical disc side) of the objective lens 16, respectively. The #7 and #8 denote the surface of the cover layer and the surface of the data recording layer of the optical disc D1, respectively.

TABLE 28

| $M_{ALL2}$ | | -0.1457 | | |
|---|---|---|---|---|
| f | | 15.99 mm | | |
| $M_{OBL2}$ | | 0.0000 | | |
| Design Wavelength | | 650 nm | | |
| Design NA | | 0.65 | | |
| Surface No. | r | d | n | ν |
| #0 | | 10.16 | | |
| #1 | | 4.00 | 1.516 | 64.2 |
| #2 | | 1.50 | | |
| #3 | -6.660 | 1.20 | 1.544 | 55.7 |
| #4 | -4.000 | 8.90 | | |
| #5(h < 1.30) | 1.464 | 1.40 | 1.544 | 55.7 |
| #5(h ≥ 1.30) | 1.497 | 1.40 | 1.544 | 55.7 |
| #6 | -6.000 | 1.17 | | |
| #7 | | 0.60 | 1.585 | 29.9 |
| #8 | | — | | |

In Table 28, #0 denotes the light source 13. The #1 and #2 denote the light source side surface and the objective lens side surface of the beam splitter 15, respectively. The #3 and #4 denote the front surface (a light source side) and the rear surface 721a (an optical disc side) of the coupling lens 721, respectively. The #5 and #6 denote the front surface (a light source side) and the rear surface (an optical disc side) of the objective lens 16, respectively. The #7 and #8 denote the surface of the cover layer and the surface of the data recording layer of the optical disc D2, respectively.

The front surface (#3) of the coupling lens 712 is a spherical surface. The rear surface 721a (#4) of the coupling lens 721 is an aspherical surface having a diffracting structure. The diffracting structure of the coupling lens 721 has the function of giving the spherical aberration, in which an amount of wavefront delay becomes greater as a distance from the optical axis increases as shown in FIG. 17, to the beam from the light source 11. Further, the diffracting structure of the coupling lens 721 has the function of correcting the spherical aberration of the beam from the light source 13.

The conical coefficient and the aspherical coefficients of the rear surface 721a (#4) of th coupling lens 721 are indicated in Table 29.

TABLE 29

| Surface No. | #4 |
|---|---|
| K | 0.0000 |
| A04 | 1.8700E-03 |
| A06 | 7.9100E-05 |
| A08 | 3.7700E-06 |
| A10 | 0.0000E+00 |
| A12 | 0.0000E+00 |

In the optical system OP71, the coupling lens 721 has an aspheric amount of the rear surface 721a (#4) of 1.40 μm at a maximum effective diameter of the rear surface 721a.

Table 30 shows values of the coefficients of the optical path difference function Φ(h) applied to the rear surface 721a (#4) of the coupling lens 721.

TABLE 30

| Surface No. | #4 |
|---|---|
| P02 | 0.0000E+00 |
| P04 | −8.6000E−01 |
| P06 | −2.6000E−02 |

In the optical system 700, the light source 11 is located on a coupling lens 721 side with respect to a front focal point of the coupling lens 721. Therefore, the beam from the light source 11 becomes a diverging beam after passing through the coupling lens 721. The light source 13 is located at a front focal point of the coupling lens 721. Therefore, the beam form the light source 13 becomes a collimated beam after passing through the coupling lens 721. That is, in the optical system OP72 the coupling lens 721 functions as a collimator lens.

In the optical system OP71, the diverging beam, which is given the aberration by the coupling lens 721, is converged by the objective lens 16 situated at the home position to form a beam spot having a suitable size on the data recording layer of the optical disc D1. The aberration given to the diverging beam is substantially the same as the wavefront aberration shown in FIG. 17. That is, the optical system OP71 is configured such that the spherical aberration generated by the coupling lens 721 and the spherical aberration generated by the objective lens 16 and the cover layer of the optical disc D1 cancel each other.

In the optical system OP72, the collimated beam, which is given no spherical aberration by the coupling lens 721, is converged by the objective lens 16 situated at the home position to form a beam spot having a suitable size on the data recording layer of the optical disc D2. The collimated beam collimated by the coupling lens 721 is corrected for its spherical aberration by the diffracting structure on the rear surface 721a.

FIG. 33 is a graph illustrating the spherical aberration generated by the coupling lens 721. As shown in FIG. 33, an effective diameter h of the rear surface 721a of the coupling lens 721 is 1.19.

According to values of the numerical structure of the coupling lens 721 shown in Table 27, $(Ra+Rb)/(Ra-Rb) = 4.008$, $(-Rb/f) \times (M_{OBL1}/M_{REF})^4 = 0.282$, and $M_{OBL1}/M_{REF} = 1.03$. Therefore, the optical system 700 of the seventh embodiment satisfies the conditions (3)–(5).

FIG. 34 is a graph illustrating the amounts of aberrations caused in the entire optical system OP71 with respect to a shift amount of the coupling lens 721. As can be seen from FIG. 34, the comas of low through high orders are effectively suppressed. For example, the comas stay within 0.06 λrms even if the coupling lens 721 shifts by 0.10 mm. That is, the optical system OP71 which satisfies the conditions (3), (4) and (5) is able to correct the coma caused by the coupling lens 721 and the objective lens 16 when the coupling lens 721 is shifted.

By satisfying the condition (5), the spherical aberration caused by the objective lens 16 and the cover layer of the optical disc D1 is set in the undercorrected direction. FIG. 35 shows a graph illustrating the total spherical aberration in the optical system OP71. Since as described above the coupling lens 721 generates the spherical aberration shown in FIG. 33, the total spherical aberration in the optical system OP71 can be reduced sufficiently as shown in FIG. 35.

Since, by numerical data shown in Tables 27 and 28, the optical system 700 of the seventh embodiment satisfies the conditions (1) and (2) as well as the condition (5), the difference between the working distances of the DVD and the CD can be lowered sufficiently. A sufficient working distance is secured for the optical disc having a relatively thick cover layer as well as the optical disc having a relatively thin cover layer.

The optical system 700 of the seventh embodiment is configured to suppress a coma caused when the objective lens 16 is laterally shifted for the tracking operation. Since a configuration for suppressing the coma caused by the lateral shift of the objective lens 16 is substantially the same as that of the first embodiment, an explanation thereof is not repeated.

Similarly to FIG. 22 of the fourth embodiment, FIG. 36 is a graph illustrating the amounts of aberrations caused in the entire optical system OP71 with respect to a shift amount of the objective lens 16. As can be seen from the comparison between FIG. 36 and FIG. 23, the total aberration of the seventh embodiment is suppressed to less than the total aberration of the conventional optical system of the optical pick-up. In FIG. 36, the coma is less than 0.08 λrms when the shift amount of the objective lens 16 is 0.4 mm. That is, the coma caused in the optical system 700 of the seventh embodiment is lowered by about 20% relative to the coma of the conventional optical system of the optical pick-up.

Since the coupling lens 721 is common to both of the optical system OP71 and the optical system OP72, manufacturing cost and a size of the optical system can be reduced to be used for a compact optical pick-up.

Eighth Embodiment

Next, an eighth embodiment of the invention will be described. FIG. 37 schematically shows an optical system 800 of an optical pick-up according to the eighth embodiment of the invention. In FIG. 37, to elements which are similar to those in FIG. 1, the same reference numbers are assigned, and the detailed description thereof will not be repeated.

As shown in FIG. 37, the optical system 800 includes an optical system OP81 which is used to record/reproduce data to/from the optical disc D1 (e.g., the CD), and an optical system OP82 which is used to record/reproduce data to/from the optical disc D2 (e.g., the DVD).

The optical system OP81 includes the light source 11, the branching optical element 17, a coupling lens 812, the beam splitter 15, the objective lens 16 and the photoreceptor 18. The optical system OP82 includes the light source 13, the branching optical element 19, a coupling lens 814, the beam splitter 15, the objective lens 16 and the photoreceptor 20. The beam splitter 15 and the objective lens 16 are used both in the optical systems OP81 and OP82.

Table 31 shows a numerical structure of the optical system OP81 according to the eighth embodiment. In Table 31, $M_{ALL1}$ represents a magnification of the entire optical system OP81, $M_{OBL1}$ represents a magnification of the objective lens 16 in the optical system OP81, and $M_{REF}$ represents a magnification of the objective lens 16 which makes the spherical aberration on the data recording layer of the optical disc D1 closest to zero when the hypothetical diverging beam equivalent to the diverging beam having no aberration is incident on the objective lens 16. In the optical system OP81, a design NA on the image side of the objective lens 16 is 0.51, and a design wavelength is 780 nm. A focal length f of the coupling lens 812 is 16.14 mm.

TABLE 31

| | | | | |
|---|---|---|---|---|
| $M_{ALL1}$ | | −0.1929 | | |
| f | | 16.12 mm | | |
| $M_{REF}$ | | −0.0725 | | |
| $M_{OBL1}$ | | −0.0749 | | |
| Design Wavelength | | 780 nm | | |
| Design NA | | 0.51 | | |

| Surface No. | r | d | n | v |
|---|---|---|---|---|
| #0 | | 9.28 | | |
| #1 | 33.670 | 1.20 | 1.544 | 55.7 |
| #2 | −11.500 | 1.03 | | |
| #3 | | 4.00 | 1.516 | 64.2 |
| #4 | | 4.20 | | |
| #5(h < 1.30) | 1.464 | 1.40 | 1.544 | 55.7 |
| #5(h ≧ 1.30) | 1.497 | 1.40 | 1.544 | 55.7 |
| #6 | −6.000 | 0.98 | | |
| #7 | | 1.20 | 1.585 | 29.9 |
| #8 | — | | | |

In Table 31, #1 and #2 denote a front surface 812a (a light source side) and a rear surface 812b (an optical disc side) of the coupling lens 812. The other symbols in Table 31 have the same meanings as those shown in Table 1.

The inner area of the front surface (#5) of the objective lens 16 is a continuous surface having no diffracting structure. The outer area of the front surface (#5) of the objective lens 16 has a diffracting structure.

The front surface 812a (#1) of the coupling lens 812, the rear surface 812b (#2) of the coupling lens 812, the front surface (#5) of the objective lens 16 and the rear surface (#6) of the objective lens 16 are rotationally-symmetrical aspherical surfaces.

The conical coefficient and the aspherical coefficients of the front surface 812a (#1) of the coupling lens 812, the rear surface 812b (#2) of the coupling lens 812, the front surface (#5) of the objective lens 16 and the rear surface (#6) of the objective lens 16 are indicated in Table 15.

TABLE 32

| | Surface No. | | | | |
|---|---|---|---|---|---|
| | #1 | #2 | #5 (h < 1.30) | #5 (h ≧ 1.30) | #6 |
| K | 0.0000 | 0.0000 | −0.5000 | −0.5000 | 0.0000 |
| A04 | 6.0000E−03 | 5.2000E−03 | −6.4900E−04 | 1.1767E−02 | 3.4870E−02 |
| A06 | 0.0000E+00 | 2.3000E−04 | 9.6020E−04 | −3.1890E−03 | −5.6500E−03 |
| A08 | 0.0000E+00 | −1.0000E−04 | −8.3440E−04 | 3.0700E−04 | −4.9590E−03 |
| A10 | 0.0000E+00 | 0.0000E+00 | 5.9340E−04 | −6.0900E−05 | 2.5000E−03 |
| A12 | 0.0000E+00 | 0.0000E+00 | −2.9380E−04 | −1.8560E−04 | −3.7200E−04 |

In the optical system OP81, the coupling lens 812 has an aspheric amount of the front surface 812a (#1) of 4.79 μm at a maximum effective diameter of the front surface 812a, and has an aspheric amount of the rear surface 812b (#2) of 4.78 μm at a maximum effective diameter of the rear surface 812b.

Table 33 shows values of the coefficients of the optical path difference function Φ(h) applied to the outer area of front surface (#5) of the objective lens 16.

TABLE 33

| Surface No. | #5 (h ≧ 1.30) (outer area) |
|---|---|
| P02 | −6.2640E+00 |
| P04 | 9.4800E+00 |
| P06 | −3.4100E+00 |

Table 34 shows a numerical structure of the optical system OP82 according to the eighth embodiment. In Table 34, $M_{ALL2}$ represents a magnification of the entire optical system OP82, and $M_{OBL2}$ represents a magnification of the objective lens 16 in the optical system OP82. In the optical system OP82, a design NA on the image side of the objective lens 16 is 0.65, and a design wavelength is 650 nm. A focal length f of the coupling lens 814 is 15.94 mm.

TABLE 34

| | | | | |
|---|---|---|---|---|
| $M_{ALL2}$ | | −0.1462 | | |
| f | | 15.94 mm | | |
| $M_{OBL2}$ | | 0.0000 | | |
| Design Wavelength | | 650 nm | | |
| Design NA | | 0.65 | | |

| Surface No. | r | d | n | v |
|---|---|---|---|---|
| #0 | | 15.41 | | |
| #1 | 33.670 | 1.20 | 1.544 | 55.7 |
| #2 | −11.500 | 1.00 | | |
| #3 | | 4.00 | 1.516 | 64.2 |
| #4 | | 4.00 | | |
| #5(h < 1.30) | 1.464 | 1.40 | 1.544 | 55.7 |
| #5(h ≧ 1.30) | 1.497 | 1.40 | 1.544 | 55.7 |
| #6 | −6.000 | 1.17 | | |
| #7 | | 0.60 | 1.585 | 29.9 |
| #8 | — | | | |

The front surface 814a (#1) of the coupling lens 814 is a spherical surface. The rear surface 814b (#2) of the coupling lens 814 is an aspherical surface. The conical coefficient and the aspherical coefficients of the rear surface 814b (#2) of the coupling lens 814 are indicated in Table 35.

TABLE 35

| Surface No. | #2 |
|---|---|
| K | 0.0000 |
| A04 | 1.1350E−04 |
| A06 | 6.2670E−07 |
| A08 | 1.5430E−09 |
| A10 | 0.0000E+00 |
| A12 | 0.0000E+00 |

The coupling lens 812 is configured to satisfy a condition:

$$-1.0 < (Ra+Rb)/(Ra-Rb) < 7.0 \quad (6)$$

where Ra represents a radius of curvature of the front surface 812a of the coupling lens 812, and Rb represents a radius of curvature of the rear surface 812b of the coupling lens 812.

By satisfying the condition (6), a coma caused by a shift of the coupling lens 812 can be canceled by a coma which the objective lens 16 generates when off-axis light is incident on the objective lens 16 due to the shift of the coupling lens 812.

Further, the coupling lens 812 and the objective lens 16 are configured to satisfy the above mentioned condition (5) and a condition (7):

$$0.15 < (-Rb/f) \times (M_{OBL1}/M_{REF}) < 0.55 \quad (7).$$

By satisfying the conditions (5) and (7), the coma caused by the shift of the coupling lens 812 is effectively suppressed even if the absolute value of the magnification $M_{OBL1}$ is set greater than the absolute value of the magnification $M_{REF}$.

In this embodiment, since (Ra+Rb)/(Ra−Rb)=0.491, $(-Rb/f) \times (M_{OBL1}/M_{REF})^4 = 0.811$, and $M_{OBL1}/M_{REF}=1.03$, the conditions (5)–(7) are satisfied.

Similarly to the abovementioned embodiments, the optical system OP81 is configured such that the spherical aberration given by the coupling lens 812 to the diverging beam incident on the objective lens 16 and the spherical aberration caused by the objective lens 16 and the cover layer of the optical disc D1 cancel each other. FIG. 38 is a graph illustrating the spherical aberration caused by the coupling lens 812.

FIG. 39 is a graph illustrating the amounts of aberrations caused in the entire optical system OP81 with respect to a shift amount of the coupling lens 812. As can be seen from FIG. 39, the comas of low through high orders are effectively suppressed. For example, the coma of third order takes a value of 0.044 at a coupling lens shift amount of 0.100. That is, the amount of coma of third order is reduced to 85% of the amount of coma of third order the fifth embodiment shown in FIG. 25.

By satisfying the condition (5), the spherical aberration caused by the objective lens 16 and the cover layer of the optical disc D1 is set in the undercorrected direction. FIG. 40 shows a graph illustrating the total spherical aberration in the optical system OP81. Since as described above the coupling lens 812 causes the spherical aberration shown in FIG. 38, the total spherical aberration in the optical system OP81 can be reduced sufficiently as shown in FIG. 40.

Since, according to numerical data shown in Tables 32 and 34, the optical system 800 of the eighth embodiment satisfies the conditions (1) and (2) as well as the condition (5), the difference between the working distances of the DVD and the CD can be lowered sufficiently. A sufficient working distance is secured for the optical disc having a relatively thick cover layer as well as the optical disc having a relatively thin cover layer.

The optical system 800 is configured to suppress a coma caused when the objective lens 16 is laterally shifted for the tracking operation. Since a configuration for suppressing the coma caused by the lateral shift of the objective lens 16 is substantially the same as that of the first embodiment, an explanation thereof is not repeated.

Similarly to FIG. 22 of the fourth embodiment, FIG. 41 is a graph illustrating the amounts of aberrations caused in the entire optical system OP81 with respect to a shift amount of the objective lens 16. As can be seen from the comparison between FIG. 41 and FIG. 23, the total aberration of the eighth embodiment is suppressed to less than the total aberration of the conventional optical system of the optical pick-up.

For example, the coma of third order takes a value of 0.084 at an objective lens shift amount of 0.4. That is, the amount of coma of third order is reduced to 85% of the amount of coma of third order of the conventional optical system shown in FIG. 23.

It should be noted that when the objective lens 16 laterally shifts due to the tracking operation in the optical system OP82, no additional aberration is caused because the beam incident on the objective lens 16 is the collimated beam.

Although the present invention has been described in considerable detail with reference to certain preferred embodiments thereof, other embodiments are possible.

For example, by decreasing the amount the spherical aberration given by the coupling lens 12 of the first embodiment, the first embodiment can also attain an advantage that the both of the coma and the astigmatism can be reduced to a practically allowable level as in the case of the third embodiment.

In the above mentioned fourth through seventh embodiments, the optical system is configured to satisfy all of the conditions (3)–(5) to reduce the coma caused by the coupling lens shift. However, by satisfying at least the condition (3), the optical system can attain the advantage that the coma caused by the coupling lens shift is corrected as in the case of the fourth through seventh embodiments.

The present disclosure relates to the subject matters contained in Japanese Patent Applications No. P2003-013244, filed on Jan. 22, 2003, and P2003-077279, filed on Mar. 20, 2003 which are expressly incorporated herein by reference in their entireties.

What is claimed is:

1. An optical system of an optical pick-up for recording/reproducing data to/from a plurality of types of optical discs including a first optical disc having a relatively thick cover layer and a second optical disc having relatively thin cover layer, comprising:

a plurality of light sources that correspond said plurality of types of optical discs;

a first coupling lens that is used at least for said first optical disc; and an objective lens that is used for said plurality of types of optical discs, wherein said first coupling lens is located on a light source side of said objective lens, wherein a beam for said first optical disc emitted by one of said plurality of light sources passes through said first coupling lens and is incident on said objective lens as a diverging beam, the diverging beam being given spherical aberration by said coupling lens, wherein the spherical aberration of the diverging beam for said first optical disc and spherical aberration caused by said objective lens and a cover layer of said first optical disc cancel each other, wherein when said objective lens shifts in a plane substantially perpendicular to an optical axis of said objective lens, a coma component relating to the spherical aberration of the diverging beam which is shifted with respect to said objective lens is canceled by a coma generated by said objective lens and the cover layer of said first optical disc.

2. The optical system according to claim 1,
wherein the spherical aberration of the diverging beam for the first optical disc is such that an amount of wavefront delay becomes greater as a distance from a center axis of said coupling lens increases.

3. The optical system according to claim 1,
wherein a degree of divergence of the diverging beam for said first optical disc incident on said objective lens is largest of all of degrees of divergence of beams emitted by said plurality of light sources when each of the beams is incident on said objective lens.

4. The optical system according to claim 1,
wherein when said first optical disc is used, a magnification $M_{OBL1}$ of said objective lens satisfies a condition:

$$-0.15 < M_{OBL1} < -0.03 \tag{1}.$$

5. The optical system according to claim 1, further comprising a second coupling lens that is used for said second optical disc, said second coupling lens being located on the light source side of said objective lens.

6. The optical system according to claim 5,
wherein a beam for said second optical disc emerged from said second coupling lens has a wavefront having a form of a substantially flat plane.

7. The optical system according to claim 6,
wherein when said second optical disc is used, a magnification $M_{OBL2}$ of said objective lens satisfies a condition:

$$-0.01 < M_{OBL2} < 0.01 \tag{2}.$$

8. The optical system according to claim 1,
wherein said first coupling lens is used for both of said first optical disc and said second optical disc.

9. The optical system according to claim 8,
wherein the beam for said first optical disc and a beam for said second optical disc emitted by said plurality of light sources have different wavelengths,
wherein said first coupling lens has a diffracting structure on at least one of its lens surfaces,
wherein when the beam for the second optical disc passes through said first coupling lens, the beam for the second optical disc having no aberration emerges from said first coupling lens.

10. The optical system according to claim 8,
wherein a beam for said second optical disc emerged from said first coupling lens has a wavefront having a form of a substantially flat plane.

11. The optical system according to claim 10,
wherein when said second optical disc is used, a magnification $M_{OBL2}$ of said objective lens satisfies a condition:

$$-0.01 < M_{OBL2} < 0.01 \tag{2}.$$

12. The optical system according to claim 1,
wherein said objective lens is configured not to cause a coma when a beam for a certain type optical disc of said plurality of types of optical discs other than said first optical disc incident thereon inclines with respect to the optical axis of said objective lens.

13. The optical system according to claim 12,
wherein said certain type optical disc requires an image side numerical aperture largest of all of said plurality of types of optical discs.

14. The optical system according to claim 1,
wherein said objective lens satisfies a condition:

$$|M_{OBL1}| > |M_{REF}|$$

where $M_{OBL1}$ represents a magnification of said objective lens when the diverging beam for said first optical disc having the spherical aberration given by said first coupling lens is incident on said objective lens, and $M_{REF}$ represents a magnification of said objective lens at which spherical aberration caused by said objective lens and the cover layer of said first optical disc takes a value closest to zero when a hypothetical diverging beam which is equivalent to the diverging beam for the first optical disc but has no aberration is incident on said objective lens, the hypothetical diverging beam having a wavelength for said first optical disc,
wherein the spherical aberration of the diverging beam for the first optical disc is such that an amount of wavefront delay becomes greater as a distance from a center axis of said coupling lens increases.

15. The optical system according to claim 14,
wherein said objective lens further satisfies a condition:

$$1.02 < M_{OBL1}/M_{REF} < 1.05 \tag{5}.$$

16. The optical system according to claim 1,
wherein said first coupling lens is configured to be a meniscus lens having a convex side thereof located on an optical disc side and to satisfy a condition:

$$1.0 < (Ra+Rb)/(Ra-Rb) < 15.0 \tag{3}$$

where Ra represents a radius of curvature of a light source side surface of said first coupling lens, and Rb represents a radius of curvature of an optical disc side surface of said first coupling lens,
wherein one of the light source side surface and the optical disc side surface of said first coupling lens has an aspherical surface having a positive aspheric amount at a maximum effective diameter thereof.

17. The optical system according to claim 16,
wherein said optical system satisfies a condition:

$$0.15 < (-Rb/f) \times (M_{OBL1}/M_{REF})^4 < 0.55 \tag{4}$$

where $M_{OBL1}$ represents a magnification of said objective lens when the diverging beam for said first optical disc having the spherical aberration given by said first coupling lens is incident on said objective lens, $M_{REF}$ represents a magnification of said objective lens at which spherical aberration caused by said objective lens and the cover layer of said first optical disc takes a value closest to zero when a hypothetical diverging beam which is equivalent to the diverging beam for the first optical disc but has no aberration is incident on said objective lens, and f represents a focal length of said first coupling lens, the hypothetical diverging beam having a wavelength for said first optical disc.

18. The optical system according to claim 1,
wherein said first coupling lens satisfies a condition:

$$-1.0 < (Ra+Rb)/(Ra-Rb) < 7.0 \qquad (6)$$

where Ra represents a radius of curvature of a light source side surface of said first coupling lens, and Rb represents a radius of curvature of an optical disc side surface of said first coupling lens, wherein each of the light source side surface and the optical disc side surface of said first coupling lens has an aspherical surface having a positive aspheric amount at a maximum effective diameter thereof.

19. The optical system according to claim 18,
wherein said optical system satisfies a condition:

$$0.30 < (-Rb/f) \times (M_{OBL1}/M_{REF})^4 < 1.00 \qquad (7)$$

where $M_{OBL1}$ represents a magnification of said objective lens when the diverging beam for said first optical disc having the spherical aberration given by said first coupling lens is incident on said objective lens, $M_{REF}$ represents a magnification of said objective lens at which spherical aberration caused by said objective lens and the cover layer of said first optical disc takes a value closest to zero when a hypothetical diverging beam which is equivalent to the diverging beam for the first optical disc but has no aberration is incident on said objective lens, and f represents a focal length of said first coupling lens, the hypothetical diverging beam having a wavelength for said first optical disc.

* * * * *